US012548488B2

(12) United States Patent
Lee et al.

(10) Patent No.: US 12,548,488 B2
(45) Date of Patent: Feb. 10, 2026

(54) IMAGE DISPLAY APPARATUS AND VIDEO WALL INCLUDING THE SAME

(71) Applicant: LG ELECTRONICS INC., Seoul (KR)

(72) Inventors: Namjoo Lee, Seoul (KR); Wonsik Kim, Seoul (KR); Jinyeol Kim, Seoul (KR); Woosik Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/660,838

(22) Filed: May 10, 2024

(65) Prior Publication Data

US 2024/0420613 A1 Dec. 19, 2024

(30) Foreign Application Priority Data

Jun. 13, 2023 (KR) ........................ 10-2023-0075619

(51) Int. Cl.
*G09G 3/20* (2006.01)
*G09G 3/32* (2016.01)

(52) U.S. Cl.
CPC ......... *G09G 3/2022* (2013.01); *G09G 3/2011* (2013.01); *G09G 3/2014* (2013.01); (Continued)

(58) Field of Classification Search
CPC .. G09G 3/2022; G09G 3/2011; G09G 3/2014; G09G 3/32; G09G 2300/026; G09G 2300/06; G09G 2320/0247
See application file for complete search history.

(56) References Cited

U.S. PATENT DOCUMENTS

2022/0246088 A1* 8/2022 Zhai ......................... G09G 3/32
2023/0206827 A1* 6/2023 Kim ....................... G11C 19/28

FOREIGN PATENT DOCUMENTS

KR 10-2014-0051199 4/2014
KR 10-2016-0036385 4/2016
(Continued)

OTHER PUBLICATIONS

Korean Intellectual Property Office Application No. 10-2023-0075619, Notice of Allowance dated Aug. 3, 2025, 3 pages.

*Primary Examiner* — Michael A Faragalla
(74) *Attorney, Agent, or Firm* — LEE, HONG, DEGERMAN, KANG & WAIMEY

(57) ABSTRACT

The present disclosure relates to an image display apparatus and a video wall including the same. The image display apparatus according to an embodiment of the present disclosure includes: a panel with a plurality of light emitting diodes; and a driving controller configured to output a scan signal to the plurality of light emitting diodes during each of a plurality of subframe periods, wherein, in response to the gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes. Accordingly, it is possible to efficiently reduce flicker.

18 Claims, 26 Drawing Sheets

(52) U.S. Cl.
CPC ......... *G09G 3/32* (2013.01); *G09G 2300/026* (2013.01); *G09G 2300/06* (2013.01); *G09G 2320/0247* (2013.01)

(56) References Cited

FOREIGN PATENT DOCUMENTS

| | | |
|---|---|---|
| KR | 10-2020-0118301 | 10/2020 |
| KR | 10-2021-0135702 | 11/2021 |

* cited by examiner

IMAGE DISPLAY APPARATUS AND VIDEO WALL INCLUDING THE SAME

CROSS-REFERENCE TO RELATED APPLICATION

Pursuant to 35 U.S.C. § 119(a), this application claims the benefit of earlier filing date and right of priority to Korean Patent Application No. 10-2023-0075619, filed on Jun. 13, 2023, the contents of which are all hereby incorporated by reference herein in their entireties.

BACKGROUND

1. Field

The present disclosure relates to an image display apparatus and a video wall including the same, and more particularly to an image display apparatus capable of efficiently reducing flicker, and a video wall including the same.

2. Description of the Related Art

An image display apparatus is an apparatus with a display that displays images.

Various types of displays are used in the image display apparatus, including a liquid crystal display panel, a light emitting diode panel, etc.

For a light emitting diode panel-based image display apparatus, an active matrix driving scheme or a passive-matrix driving scheme is used in order to drive the light emitting diode panel.

When driving the light emitting diode panel-based image display apparatus based on the passive-matrix driving scheme, light emitting diodes are made to emit light or not by using a plurality of subframes.

However, if no light is emitted for a considerable length of time during a plurality of subframes, flicker occurs when an image is outputted.

Korean Patent Registration No. 10-2268047, which is Prior Art Document 1, discloses an image processing apparatus and method for reducing flicker in an image display device, in which a single frame pulse is converted into a number of sub-pulses in such a way that the sub-pulses are equal in area and differ in pulse amplitude and pulse width, and the sub-pulses are outputted to a corresponding pixel as the single frame pulse.

Korean Patent Registration No. 10-2499638, which is Prior Art Document 2, discloses a display device capable of alleviating flicker and a pulse-width modulator included in the same, in which subframes having different active units of time are arranged in a distributed manner.

However, according to Prior Art Document 1, the pulse conversion with different pulse amplitudes and different pulse widths makes the driving complex.

On the other hand, according to Prior Art Document 2, subframes have different active units of time in order to alleviate flicker, but flicker cannot be efficiently reduced since pulse level modulation is not employed.

SUMMARY

It is an object of the present disclosure to provide an image display apparatus capable of efficiently reducing flicker, and a video wall including the same.

It is another object of the present disclosure to provide an image display apparatus capable of easily reducing flicker at low gray levels, and a video wall including the same.

It is yet another object of the present disclosure to provide an image display apparatus capable of efficiently reducing flicker by outputting a data signal corresponding to a light emitting diode, and a video wall including the same.

In accordance with an aspect of the present disclosure, the above and other objects can be accomplished by providing an image display apparatus comprising: a panel with a plurality of light emitting diodes; and a driving controller configured to output a scan signal to the plurality of light emitting diodes during each of a plurality of subframe periods, wherein, in response to the gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes.

Meanwhile, the level of a data signal outputted by the driving controller when the gray level of the frame is below the predetermined level may be less than the level of a data signal outputted by the driving controller when the gray level of the frame is above the predetermined level.

Meanwhile, the driving controller may control a level of a data signal when the gray level of the frame is a first level below the predetermined level, to be lower than level of a data signal when the gray level of the frame is the predetermined level.

Meanwhile, the driving controller may be configured to control the light emitting diodes to emit light during a second number of subframe periods greater than a first number of subframe periods set when the gray level of the frame is below the predetermined level.

Meanwhile, the driving controller may be configured to control the light emitting diodes to emit light during a second light emission period longer than a first light emission period set when the gray level of the frame is below the predetermined level.

Meanwhile, in response to the gray level of the frame being below the predetermined level, the driving controller may output the data signal based on pulse amplitude modulation to the light emitting diodes during each of the second number of subframe periods.

Meanwhile, in response to the gray level of the frame being below the predetermined level, the driving controller may output a data signal of the same level to the light emitting diodes during each of the second number of subframe periods.

Meanwhile, in response to the gray level of the frame being below the predetermined level, the driving controller may output data signals of different levels to the light emitting diodes during each of the second number of subframe periods.

Meanwhile, in response to the gray level of the frame being below the predetermined level, the driving controller may output a data signal of the same level to the light emitting diodes during part of each of the second number of subframe periods.

Meanwhile, in response to the gray level of the frame being below the predetermined level, the driving controller may be configured to control the light emitting diodes to emit light during each of the plurality of subframe periods.

Meanwhile, in response to the gray level of the frame being below the predetermined level, the driving controller may output the data signal based on pulse amplitude modulation to the light emitting diodes during each of the plurality of subframe periods.

Meanwhile, in response to the gray level of the frame being below the predetermined level, the driving controller may output a data signal of the same level to the light emitting diodes during each of the plurality of subframe periods.

Meanwhile, in response to the gray level of the frame being below the predetermined level, the driving controller may output data signals of different levels to the light emitting diodes during each of the plurality of subframe periods.

Meanwhile, in response to the gray level of the frame being below the predetermined level, the driving controller may output a data signal of the same level to the light emitting diodes during part of each of the plurality of subframe periods.

Meanwhile, in response to the gray level of the frame being above the predetermined level, the driving controller may output a data signal based on pulse width modulation to the light emitting diodes during each of the plurality of subframe periods, and in response to the gray level of the frame being below the predetermined level, the driving controller may output a data signal based on pulse amplitude modulation to the light emitting diodes during each of the plurality of subframe periods.

Meanwhile, the plurality of light emitting diodes may include a red light emitting diode, a green light emitting diode, and a blue light emitting diode, and the driving controller may be configured to control the level of a data signal supplied to the red light emitting diode to be lower than the level of a data signal supplied to the green light emitting diode or the blue light emitting diode.

Meanwhile, the plurality of light emitting diodes may include a red light emitting diode, a green light emitting diode, and a blue light emitting diode, and, in response to the gray level of a frame including a plurality of subframes being above the predetermined level, the driving controller may be configured to control the number of subframes during which the red light emitting diode emits light to be less than or equal to the number of subframes during which the green light emitting diode or the blue light emitting diode emits light.

Meanwhile, the plurality of light emitting diodes may include a red light emitting diode, a green light emitting diode, and a blue light emitting diode, and, in response to the gray level of a frame including a plurality of subframes being a first level below the predetermined level, the driving controller may be configured to control the number of subframes during which the red light emitting diode emits light to be less than or equal to the number of subframes during which the green light emitting diode or the blue light emitting diode emits light.

Meanwhile, the image display apparatus may further comprise a signal processing device for outputting an image signal to the panel.

In accordance with another aspect of the present disclosure, the above and other objects can be accomplished by providing an image display apparatus comprising: a panel having a plurality of light emitting diodes; and a driving controller configured to output a scan signal to the plurality of light emitting diodes during each of a plurality of subframe periods, wherein, in response to the gray level of a frame being below a predetermined level, the driving controller outputs a data signal based on pulse amplitude modulation to the light emitting diodes while dividing the gray level of the frame and distributing the divided gray level across at least part of the subframes.

In accordance with one aspect of the present disclosure, the above and other objects can be accomplished by providing a video wall comprising a plurality of image display apparatuses, the image display apparatuses each comprising: a panel with a plurality of light emitting diodes; and a driving controller configured to output a scan signal to the plurality of light emitting diodes during each of a plurality of subframe periods, wherein, in response to the gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes.

In accordance with another aspect of the present disclosure, the above and other objects can be accomplished by providing a video wall comprising a plurality of image display apparatuses, the image display apparatuses each comprising: a panel having a plurality of light emitting diodes; and a driving controller configured to output a scan signal to the plurality of light emitting diodes during each of a plurality of subframe periods, wherein, in response to the gray level of a frame being below a predetermined level, the driving controller outputs a data signal based on pulse amplitude modulation to the light emitting diodes while dividing the gray level of the frame and distributing the divided gray level across at least part of the subframes.

DETAILED DESCRIPTION OF THE PREFERRED EMBODIMENTS

Hereinafter, the present disclosure will be described in detail with reference to the accompanying drawings.

The suffixes "module" and "unit" in elements used in description below are given only in consideration of ease in preparation of the specification and do not have specific meanings or functions. Therefore, the suffixes "module" and "unit" may be used interchangeably.

Figure 1:
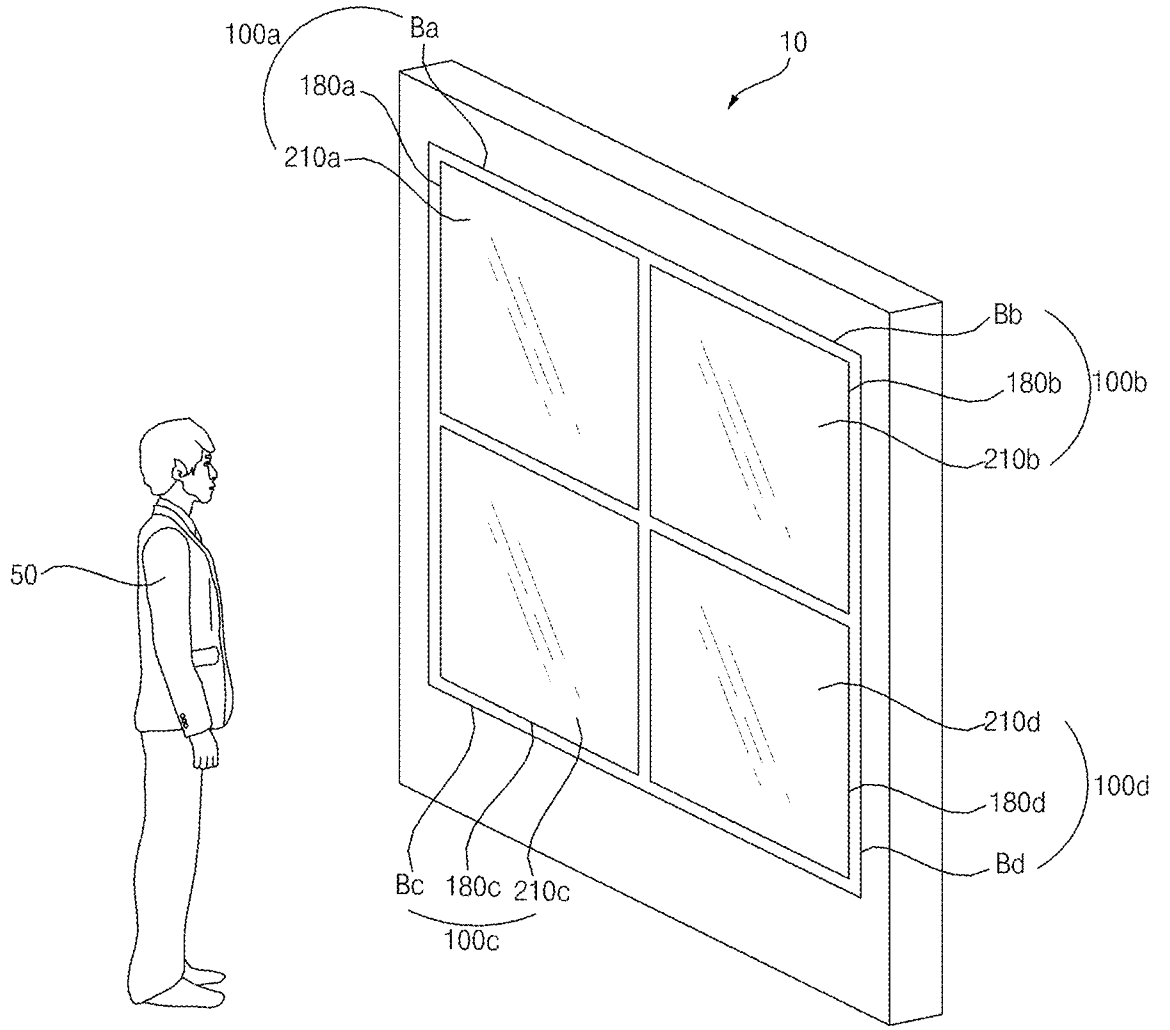
FIG. 1 is a diagram illustrating a video wall according to an embodiment of the present disclosure.

FIG. 1 is a diagram illustrating a video wall according to an embodiment of the present disclosure.

Referring to the drawing, the video wall 10 according to an embodiment of the present disclosure may include a plurality of image display apparatuses 100*a* to 100*d*.

The video wall 10 according to an embodiment of the present disclosure may receives images from the set-top box (not shown), the server (not shown), an internal memory, or the like.

For example, the video wall 10 may receive an image signal from the set-top box (not shown) through an HDMI terminal.

In another example, the video wall 10 may receive an image signal from the server (not shown) through a network terminal.

Meanwhile, the video wall 10 may be installed inside or outside a building.

For example, the video wall 10 may be provided in public places such as vehicles, bus terminals, railroad stations and airports, in order to provide information such as advertisements, news and notices. In addition, the display apparatus may be provided near display windows of department stores, shopping malls or markets, for advertisements of specific products.

In another example, the video wall 10 may be installed on a wall surface in a house.

The video wall 10 may comprise a plurality of displays 180*a* to 180*d* arranged contiguously.

Meanwhile, a plurality of displays 180*a* to 180*d* may be implemented with any one of various panels. For example, the plurality of displays 180*a* to 180*d* may be any one of a liquid crystal display (LCD) panel, a light emitting diode (OLED) panel, an inorganic light emitting diode (LED) panel, and the like.

The following description will be made based on an example in which the plurality of displays 180*a* to 180*d* comprise the inorganic light emitting diode (LED) panel.

Meanwhile, the inorganic light emitting diode (LED) panel includes light emitting diodes, and is advantageous in that it has a fast response speed and can reproduce colors very well.

Meanwhile, the plurality of displays 180*a* to 180*d* may comprise a plurality of panels 210*a* to 210*d* and bezels Ba to Bd surrounding the panels 210*a* to 210*d*, respectively.

In the figure, the video wall 10 includes a plurality of image display apparatuses 100*a* to 100*d* including respective displays 180*a* to 180*d*.

Alternatively, for image display of the video wall 10, signal processing devices 170 to 170*d* provided respectively in the plurality of image display apparatuses 100*a* to 100*d* may be used.

For example, images distributed by the signal processing device 170 may be inputted into the signal processing devices 170 to 170*d* provided respectively in the plurality of image display devices 100*a* to 100*d*, and images whose image signals are processed by the respective signal processing devices 170 to 170*d* may be inputted into the respective displays 180*a* to 180*d*, and the respective displays 180*a* to 180*d* may display the images.

Accordingly, a viewer 50 can view the images displayed through the video wall 10 as shown in the figure. In particular, the viewer can view the images displayed through the plurality of displays 180*a* to 180*d*.

In another example, the video wall 10 may comprise one signal processing device for commonly controlling the plurality of image display apparatuses 100*a* to 100*d*. The common signal processing device may perform signal processing on the displayed image. The processed images may be input to the displays 180*a* to 180*d* and the respective displays 180*a* to 180*d* may display the images.

Meanwhile, in the case where the plurality of displays 180*a* to 180*d* include an inorganic light emitting diode panel including light emitting diodes, and the light emitting diodes emit light or not by using a plurality of subframes based on a passive-matrix scheme, flicker may occur when an image is outputted.

Particularly, if no light is emitted for a considerable length of time during a plurality of subframes, severe flicker may occur.

In this regard, the present disclosure adopts a method in which a data signal based on pulse amplitude modulation is outputted to light emitting diodes at low gray levels, and a data signal based on pulse width modulation is outputted to the light emitting diodes at gray levels other than the low gray levels. Accordingly, it is possible to efficiently reduce flicker. In particular, flicker can be easily reduced at low gray levels. This will be described in detail with reference to FIG. 9 and the subsequent figures.

Figure 2:
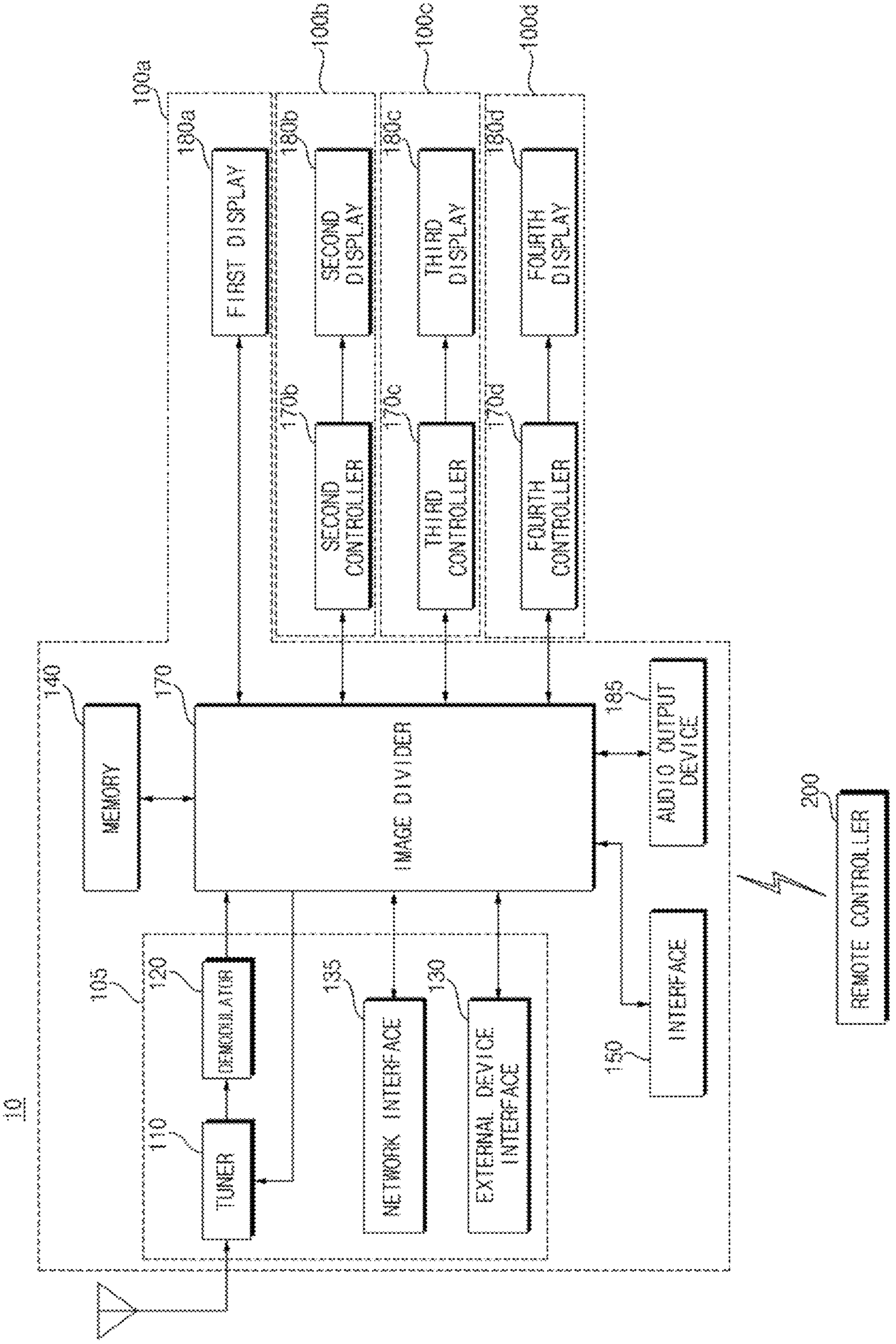
FIG. 2 is an example of an internal block diagram of a video wall of FIG. 1.

FIG. 2 is an example of an internal block diagram of a video wall of FIG. 1.

Referring to the drawing, the video wall 10 may comprise a first to fourth image display apparatuses 100*a* to 100*d*.

In the drawing, an example is illustrated in which the second to fourth image display apparatuses 100*b* to 100*d* have second to fourth displays 180*b* to 180*d*, respectively, or a second to fourth signal processing devices 170*b* to 170*d*, respectively, but may comprise an external device interface, a network interface, a memory, an image divider, a power supply, an audio output device 185, etc., unlike the drawing.

Meanwhile, the first image display apparatus 100*a* may comprise an external device interface 130, a network interface 135, a memory 140, a user input interface 150, a signal processing device 170, a first display 180*a*, a power supply 190, an audio output device 185, and the like.

The external device interface 130 may serve to transmit or receive data to or from an external device (not shown) connected thereto. The external device interface 130 may comprise an A/V input/output (I/O) device (not shown) or a data input/output module (not shown).

For example, the external device interface 130 may comprise an HDMI port, an RGB port, a component port, a USB port, a micro SD port, etc.

The network interface 135 serves as an interface between the image video wall 100 and a wired/wireless network such as the Internet. For example, the network interface 135 may receive content or data provided by an Internet or content provider or a network operator over a network.

The memory 140 may store various programs necessary for the signal processing device 170 to process and control signals, and may also store processed video, audio and data signals.

Further, the memory 140 may temporarily store a video, audio and/or data signal received from the external device interface 130.

Meanwhile, the plurality of displays 180*a* to 180*d* may be contiguously arranged, may comprise various display panels such as LCDs, OLEDs, PDPs, etc., and may display predetermined images through the display panels.

The user input interface 150 transmits a signal input by the user to the signal processing device 170 or transmits a signal received from the signal processing device 170 to the user.

To this end, the user input interface 150 may comprise a local key comprising a power key, a touch panel for inputting user information, etc.

The signal processing device 170 may divide an input image stored in the memory 140 or an input image received from an external device through the external device interface 130 or the network interface 135 into a plurality of images, for displaying the input image through the plurality of displays 180*a* to 180*d*.

For example, the signal processing device 170 may crop the input image into a plurality of images and scale the images.

In particular, the signal processing device 170 may perform cropping and scaling in consideration of the resolution and size of the plurality of displays 180*a* to 180*d*.

Meanwhile, the signal processing device 170 may perform overall control of the video wall 10, and, more particularly, control operation of the units of the video wall 10.

Meanwhile, the signal processing device 170 may distribute images and send the distributed images to the plurality of signal processing devices 170 to 170*d*.

Meanwhile, at least one signal processing device may be provided in order to control the plurality of displays 180*a* to 180*d*.

Meanwhile, in the figure, the plurality of signal processing devices 170 to 170*d* corresponding to the plurality of displays 180*a* to 180*d* is shown, in order to control the plurality of displays 180*a* to 180*d*.

The plurality of signal processing devices 170 to 170*d* may perform control operation for image display through the plurality of displays 180*a* to 180*d*.

The plurality of signal processing devices 170 to 170*d* may process an input image signal and send the processed image signal to the plurality of displays 180*a* to 180*d*, respectively.

That is, each of the plurality of signal processing devices 170 to 170*d* may control the plurality of displays 180*a* to 180*d* to output a predetermined image. More specifically, RGB signals corresponding to a video image to be displayed may be output through the plurality of displays 180*a* to 180*d*. Thus, the plurality of displays 180*a* to 180*d* may display respective images.

The power supply 190 may receive external or internal power and supply power necessary for operation of the components.

The power supply 190 supplies power to the image video wall 100 and, more particularly, the plurality of signal processing devices 170 to 170*d* implemented in the form of a system on chip (SOC), the plurality of displays 180*a* to 180*d* for displaying video, and the audio output device 185 for outputting audio.

A temperature sensor (not shown) may sense the temperature of the video wall 10.

The temperature sensed by the temperature sensor (not shown) may be inputted to at least one of the plurality of signal processing devices 170 to 170*d*, and at least one of the plurality of signal processing devices 170 to 170*d* may control operation of a fan driver (not shown) in order to reduce internal heat based on the sensed temperature.

Meanwhile, the image display apparatus 100*a* according to an embodiment of the present disclosure may include an image receiver 105, a memory 140, a user input interface 150, a sensor part (not shown), a signal processing device 170, a display 180, and an audio output device 185.

The image receiver 105 may comprise a tuner 110, a demodulator 120, a network interface 135, and an external device interface 130.

Meanwhile, unlike the drawing, the image receiver 105 may comprise only the tuner 110, the demodulator 120, and the external device interface 130. That is, the network interface 135 may not be comprised.

The tuner 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner 110 can process a digital broadcast signal or an analog broadcast signal. The analog baseband image or audio signal (CVBS/SIF) output from the tuner 110 may be directly input to the signal processing device 170.

Meanwhile, the tuner 110 can comprise a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner 110 and performs a demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the signal processing device 170. The signal processing device 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may comprise an A/V input and output device (not shown).

The external device interface 130 may be connected in wired or wirelessly to an external apparatus such as a digital versatile disk (DVD), a Blu ray, a game equipment, a camera, a camcorder, a computer (notebook), and a set-top box, and may perform an input/output operation with an external apparatus.

The A/V input and output device may receive image and audio signals from an external apparatus. Meanwhile, a wireless communication device (not shown) may perform short-range wireless communication with other electronic apparatus.

Through the wireless communication device (not shown), the external device interface 130 may exchange data with an adjacent mobile terminal (not shown). In particular, in a mirroring mode, the external device interface 130 may receive device information, executed application information, application image, and the like from the mobile terminal (not shown).

The network interface 135 provides an interface for connecting the image display apparatus 100 to a wired/wireless network comprising the Internet network. For example, the network interface 135 may receive, via the network, content or data provided by the Internet, a content provider, or a network operator.

Meanwhile, the network interface 135 may comprise a wireless communication device (not shown).

The memory 140 may store a program for each signal processing and control in the signal processing device 170, and may store a signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory 140 is provided separately from the signal processing device 170, the scope of the present disclosure is not limited thereto. The memory 140 may be comprised in the signal processing device 170.

The user input interface 150 transmits a signal input by the user to the signal processing device 170 or transmits a signal from the signal processing device 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processing device 170, may transfer a user input signal input from a sensor device (not shown) that senses a user's gesture to the signal processing device 170, or may transmit a signal from the signal processing device 170 to the sensor device (not shown).

The signal processing device 170 may demultiplex the input stream through the tuner 110, the demodulator 120, the network interface 135, or the external device interface 130, or process the demultiplexed signals to generate and output a signal for image or audio output.

For example, the signal processing device 170 receives a broadcast signal received by the image receiver 105 or an HDMI signal, and perform signal processing based on the received broadcast signal or the HDMI signal to thereby output a signal-processed image signal.

The image signal processed by the signal processing device 170 is input to the display 180, and may be displayed as an image corresponding to the image signal. In addition, the image signal processed by the signal processing device 170 may be input to the external output apparatus through the external device interface 130.

The audio signal processed by the signal processing device 170 may be output to the audio output device 185 as an audio signal. In addition, audio signal processed by the signal processing device 170 may be input to the external output apparatus through the external device interface 130.

Although not shown in FIG. 2, the signal processing device 170 may comprise a demultiplexer, an image processor, and the like. That is, the signal processing device 170 may perform a variety of signal processing and thus it may be implemented in the form of a system on chip (SOC). This will be described later with reference to FIG. 3.

In addition, the signal processing device 170 can control the overall operation of the image display apparatus 100. For example, the signal processing device 170 may control the tuner 110 to control the tuning of the RF broadcast corresponding to the channel selected by the user or the previously stored channel.

In addition, the signal processing device 170 may control the image display apparatus 100 according to a user command input through the user input interface 150 or an internal program.

Meanwhile, the signal processing device 170 may control the display 180 to display an image. At this time, the image displayed on the display 180 may be a still image or a moving image, and may be a 2D image or a 3D image.

Meanwhile, the signal processing device 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processing device 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processing device 170, an image signal, a data signal, a control signal, and the like received from the external device interface 130.

Meanwhile, the display 180 may be configured as a touch screen and used as an input device in addition to an output device.

The audio output device 185 receives a signal processed by the signal processing device 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the signal processing device 170.

The signal processing device 170 may sense a gesture of the user based on each of the images photographed by the photographing device (not shown), the signals detected from the sensor device (not shown), or a combination thereof.

The power supply 190 supplies corresponding power to the image display apparatus 100. Particularly, the power may be supplied to a signal processing device 170 which can be implemented in the form of a system on chip (SOC), a display 180 for displaying an image, and an audio output device 185 for outputting an audio.

Specifically, the power supply 190 may comprise a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
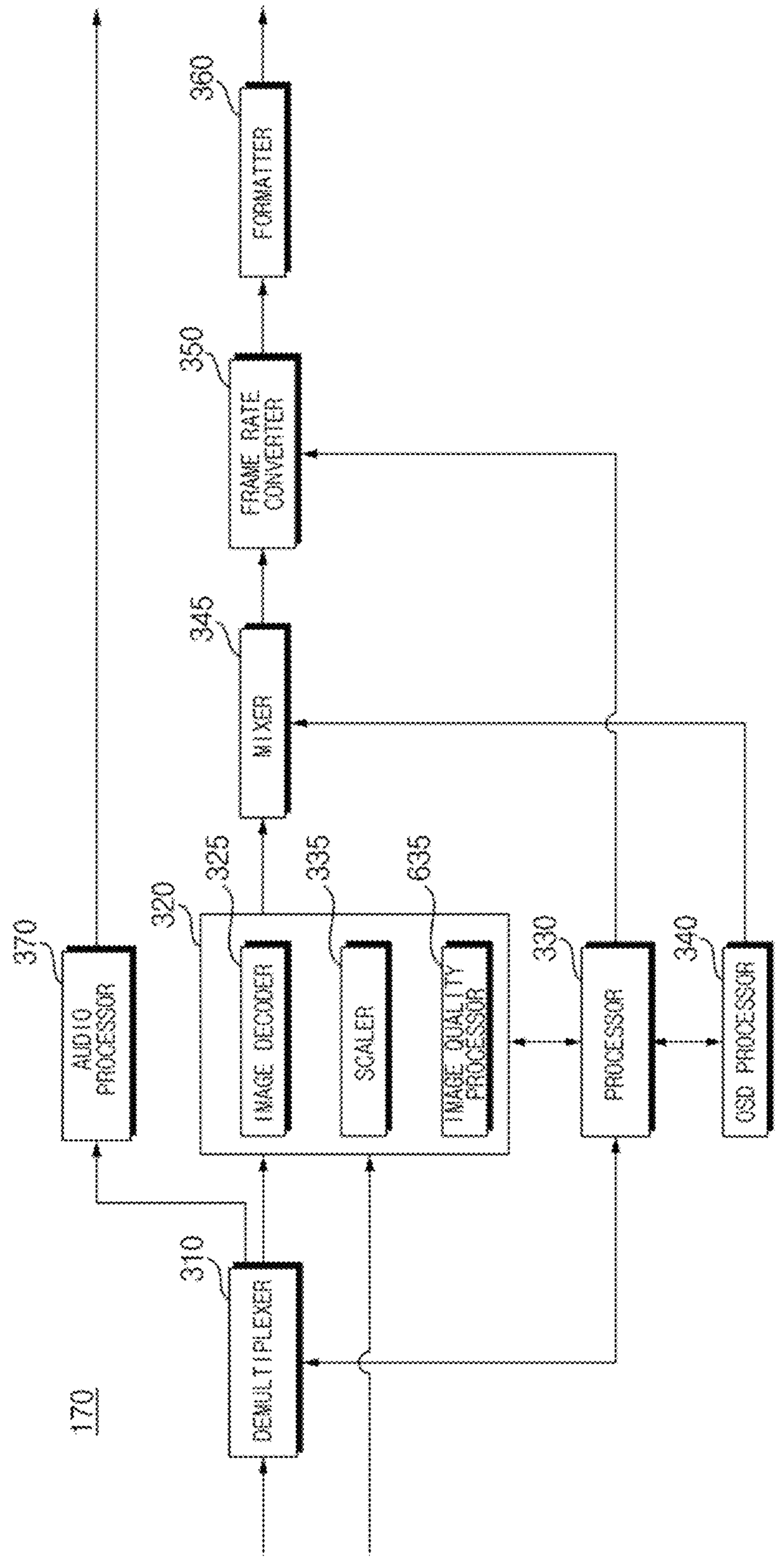
FIG. 3 is an example of an internal block diagram of an image display apparatus of FIG. 1.

FIG. 3 is an example of an internal block diagram of a signal processing device of FIG. 2.

Referring to the drawing, the signal processing device 170 according to an embodiment of the present disclosure may comprise a demultiplexer 310, an image processor 320, a processor 330, and an audio processor 370. In addition, the signal processing device 170 may further comprise and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner 110, the demodulator 120, or the external device interface 130.

The image processor 320 may perform signal processing on an input image. For example, the image processor 320 may perform image processing on an image signal demultiplexed by the demultiplexer 310.

To this end, the image processor 320 may comprise an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can comprise a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 635 may perform noise reduction processing on an input image signal, extend a resolution of high gray level of the input image signal, perform image resolution enhancement, perform high dynamic range (HDR)-based signal processing, change a video frame rate, or perform image quality processing appropriate for properties of a panel, especially a light emitting diode panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may comprise various data such as a user interface screen of the image display apparatus 100, various menu screens, a widget, and an icon. In addition, the generated OSD signal may comprise a 2D object or a 3D object.

In addition, the OSD processor 340 may generate a pointer that can be displayed on the display, based on a pointing signal input from the remote controller 200. In particular, such a pointer may be generated by a pointing controller, and the OSD processor 240 may comprise the pointing controller (not shown). Obviously, the pointing controller (not shown) may be provided separately from the OSD processor 240.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processing device 170.

For example, the processor 330 may control the tuner 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external device interface 130.

In addition, the processor 330 may control the demultiplexer 310, the image processor 320, and the like in the signal processing device 170.

Meanwhile, the audio processor 370 in the signal processing device 170 may perform the audio processing of the demultiplexed audio signal. To this end, the audio processor 370 may comprise various decoders.

In addition, the audio processor 370 in the signal processing device 170 may process a base, a treble, a volume control, and the like.

The data processor (not shown) in the signal processing device 170 may perform data processing of the demultiplexed data signal. For example, when the demultiplexed data signal is a coded data signal, it can be decoded. The encoded data signal may be electronic program guide information comprising broadcast information such as a start time and an end time of a broadcast program broadcasted on each channel.

Figure 4:
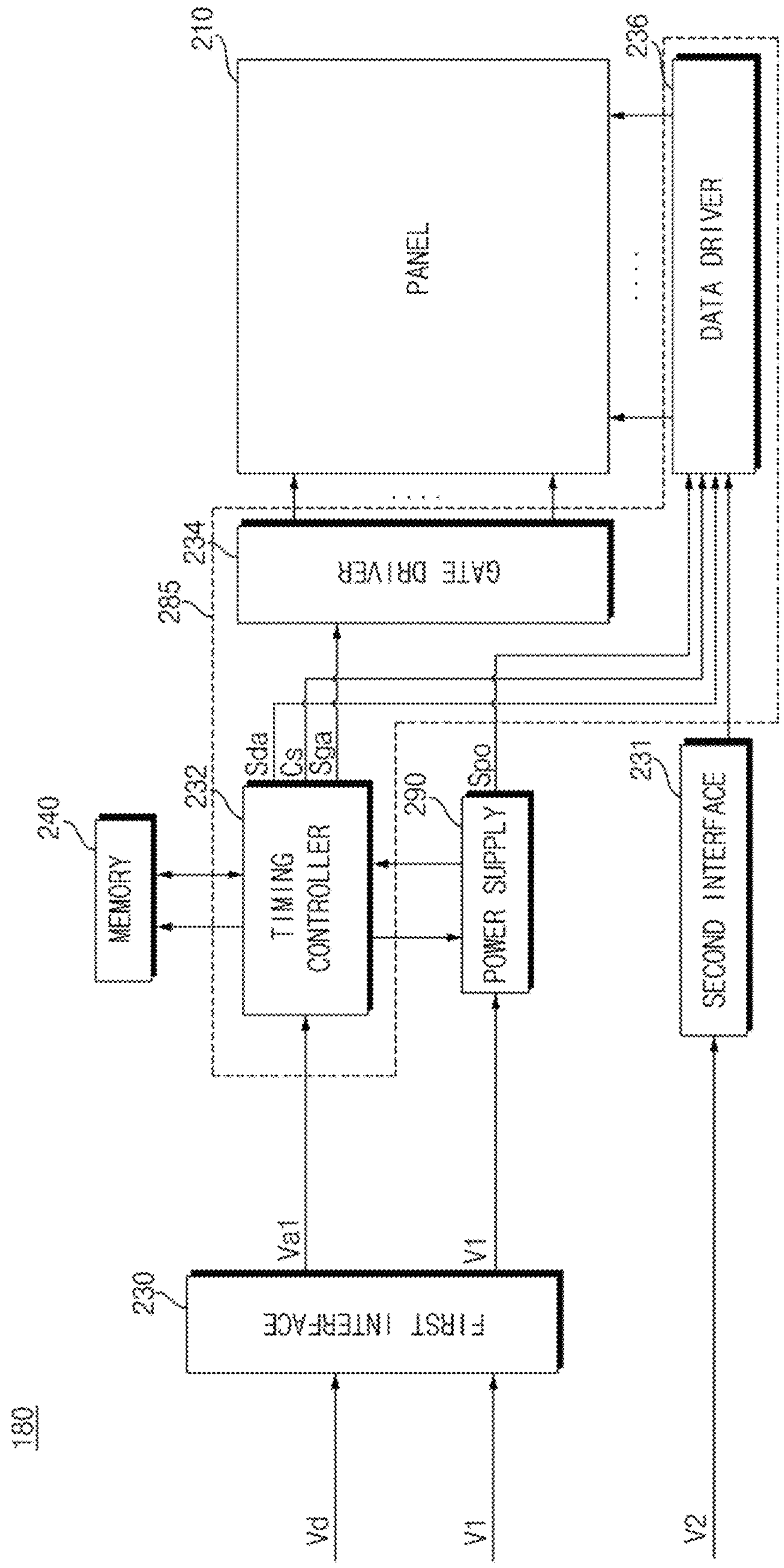
FIG. 4 is an internal block diagram of a display of FIG. 2.

Meanwhile, a block diagram of the signal processing device 170 shown in FIG. 4 is a block diagram for an embodiment of the present disclosure. Each component of the block diagram may be integrated, added, or omitted according to a specification of the signal processing device 170 actually implemented.

In particular, the frame rate converter 350 and the formatter 360 may be provided separately in addition to the image processor 320.

FIG. 4 is an internal block diagram of a display of FIG. 2.

Referring to the drawing, the light emitting diode panel-based display 180 may include a light emitting diode panel 210, a first interface 230, a second interface 231, a timing controller 232, a gate driver 234, a data driver 236, a memory 240, a power supply 290, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processing device 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processing device 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 comprises a RGB subpixel, the data driving signal Sda may be a data driving signal for driving of RGB subpixel.

Meanwhile, the timing controller 232 may further output a control signal Cs to the gate driver 234.

The gate driver 234 and the data driver 236 supply a scan signal and a data signal to the light emitting diode panel 210 through a gate line GL and a data line DL respectively, according to the gate driving signal Sga and the data driving signal Sda from the timing controller 232. Accordingly, the light emitting diode panel 210 displays a certain image.

Meanwhile, the light emitting diode panel 210 may include a light emitting layer. In order to display an image, a plurality of gate lines GL and data lines DL may be disposed in a matrix form in each pixel corresponding to the light emitting layer.

Meanwhile, the gate line GL may be called a scan line since a scan signal is inputted through it.

Meanwhile, the data driver 236 may output a data signal to the light emitting diode panel 210 based on a second DC power V2 from the second interface 231.

The power supply 290 may supply various power supplies to the gate driver 234, the data driver 236, the timing controller 232, and the like.

Meanwhile, in the drawing, the timing controller 232, the gate driver 234, and the data driver 236 may be implemented as a single integrated circuit IC.

Accordingly, the timing controller 232, the gate driver 234, and the data driver 236 may be called a driving controller 285.

Figure 5A:
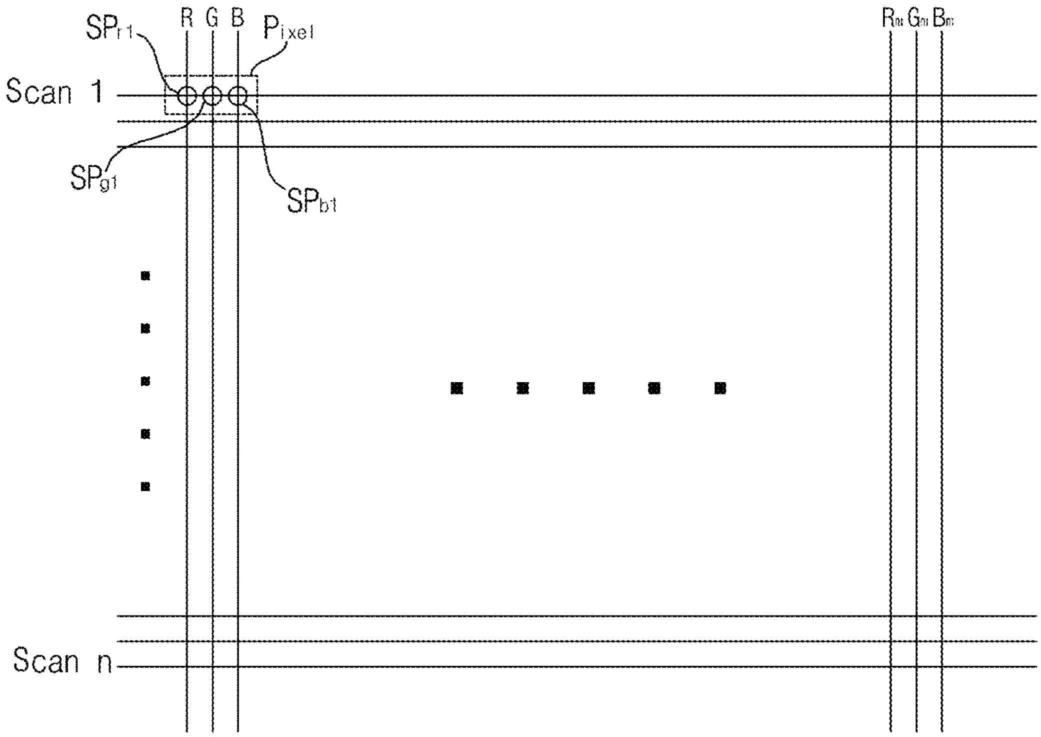
FIGS. 5A to 5C are diagrams referred to in the description of a light emitting diode panel of FIG. 4.
Figure 5B:
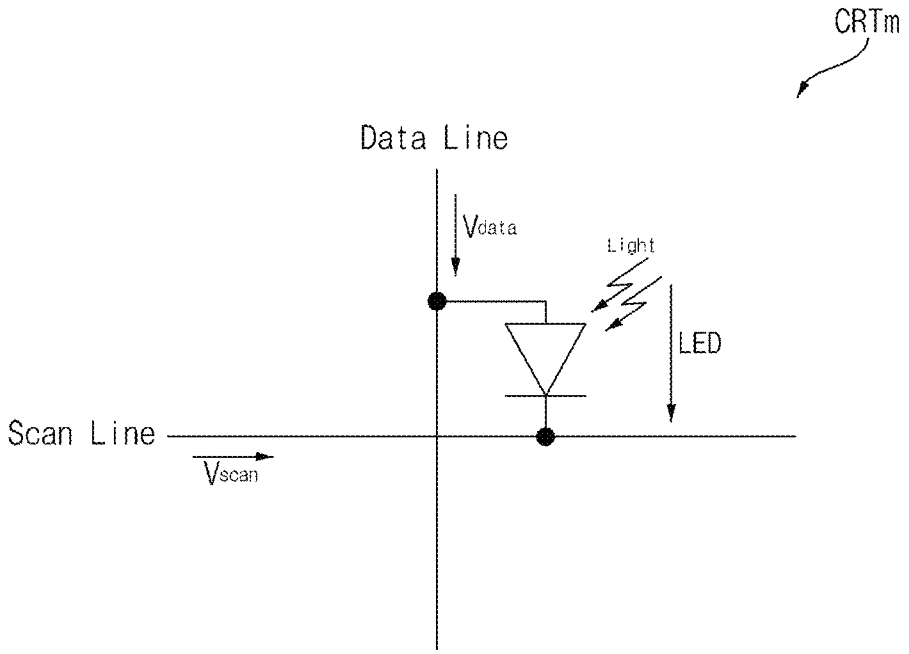

FIG. 5A and FIG. 5B are diagrams referred to in the description of a light emitting diode panel of FIG. 4.

Firstly, FIG. 5A is a diagram illustrating a pixel in the light emitting diode panel 210.

Referring to drawing, the light emitting diode panel 210 may include a plurality of scan lines Scan 1 to Scan n and a plurality of data lines R1, G1, and B1 to Rm, Gm, and Bm intersecting the scan lines.

Meanwhile, a pixel (subpixel) is defined in an intersecting area of the scan line and the data line in the light emitting diode panel 210. In the drawing, a pixel comprising subpixels SR1, SG1, and SB1 of RGB is shown.

Meanwhile, a red light emitting diode, a green light emitting diode, and a blue light emitting diode are disposed in the subpixels SR1, SG1, and SB1 of RGB.

FIG. 5B illustrates a circuit of any one sub-pixel in the pixel of the light emitting diode panel of FIG. 5A.

Referring to the drawing, a light emitting sub pixel circuit (CRTm) may be passive type, and may include a light emitting diode LED alone without a switching element.

As shown in the drawing, an anode of the light emitting diode LED may be connected to a data line through which a data signal Vdata is inputted, and a cathode of the light emitting diode LED may be connected to a scan line through which a scan signal Vscan is inputted.

Meanwhile, the light emitting diode may emit light or not, based on a plurality of subframes based on the passive matrix scheme.

Figure 5C:
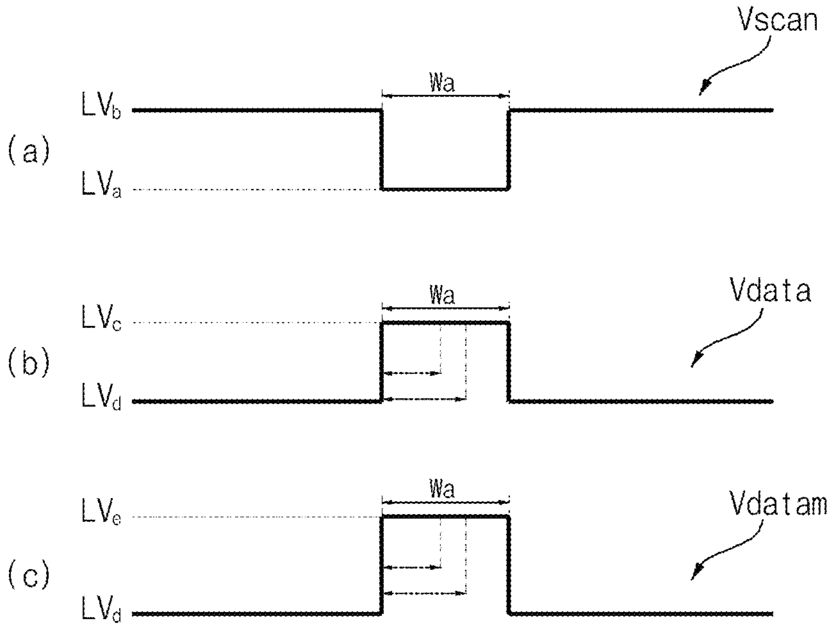

FIG. 5C is a diagram showing an example of a scan signal and data signals.

Referring to the drawing, a scan signal Vscan applied to a red light emitting diode, a green light emitting diode, and a blue light emitting diode maintains LVb level and then drops to LVa level at a scan timing.

In this case, the width of the scan signal Vscan may be set to Wa.

Meanwhile, the red light emitting diode may have higher luminance efficiency than the green light emitting diode and the blue light emitting diode because of the device characteristics.

In response to this, the driving controller 285 may be configured to control the level of a data signal supplied to the red light emitting diode to be lower than the level of a data signal supplied to the green light emitting diode or the blue light emitting diode.

(b) of FIG. 5C illustrates a data signal Vdata which maintains LVd level and rises to LVc level in response to a scan timing of the scan signal Vscan.

(c) of FIG. 5C illustrates a data signal Vdatam which maintains LVd level and rises to LVe level which is higher than LVc level in response to a scan timing of the scan signal Vscan.

The data signal Vdata of LVc level may be applied to the red light emitting diode, and the data signal Vdatam of LVe level which is higher than LVc level may be applied to the green light emitting diode or the blue light emitting diode.

Accordingly, a data signal corresponding to a light emitting diode can be outputted, and furthermore uniform colors can be rendered.

Meanwhile, the data signal Vdatda in (b) of FIG. 5C or the data signal Vdatam in (c) of FIG. 5C are data signal based on pulse width modulations, and the luminance of the light emitting diodes varies with variations in duty corresponding to pulse width.

Figure 6:
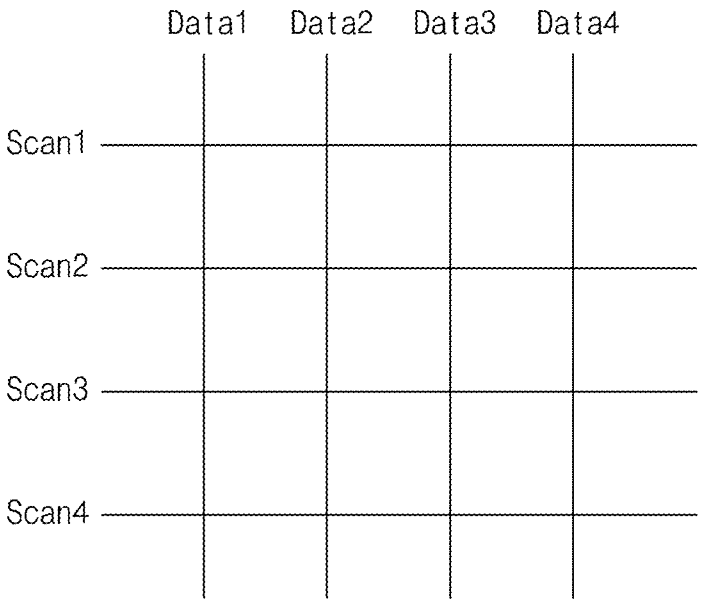
FIG. 6 is a diagram illustrating an example of the light emitting diode panel of FIG. 4.

FIG. 6 is a diagram illustrating an example of the light emitting diode panel of FIG. 4.

Referring to the drawing, the light emitting diode panel 210 may include a plurality of data lines and a plurality of scan lines.

In FIG. 6, as an example of the light emitting diode panel 210, four data lines Data1 to Data4 and four scan lines Scan1 to Scan4 are illustrated for convenience of explanation.

FIGS. 7A to 8B are diagrams referred to in the description of an operation of an image display apparatus related to the present disclosure.

Figure 7A:
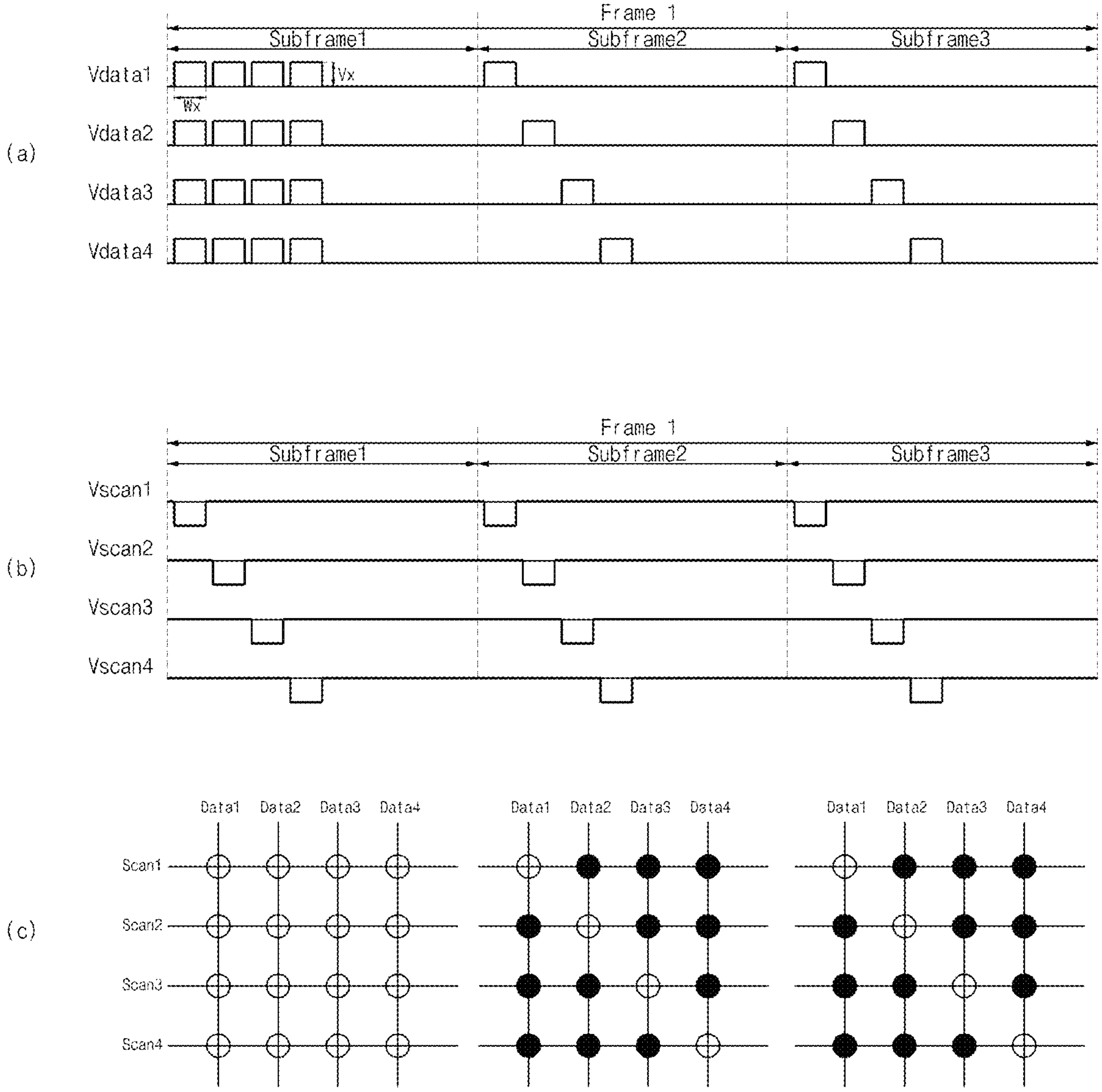
FIGS. 7A to 8B are diagrams referred to in the description of an operation of an image display apparatus related to the present disclosure.

FIG. 7A illustrates an example of a data signal applied when a frame has a first gray level, during a plurality of subframe periods within a frame period.

Referring to the drawings, a plurality of subframe periods Subframes 1 to 3 may be included within a frame period Frame 1.

Although the drawing illustrates a plurality of subframe periods Subframes 1 to 3 within a frame period Frame 1 for convenience of explanation, many variations may be made.

(a) of FIG. 7A illustrates that data signals Vdata 1 to 4 are respectively applied to the four data lines shown in FIG. 6 during the first subframe period Subframe 1 which is one of the plurality of subframe periods Subframes 1 to 3.

In the drawing, data signals Vdata 1 to 4 each having four pulses or voltages Vx are respectively applied to four data lines during the first subframe period Subframe 1.

In this case, the pulse width of the data signals Vdata 1 to 4 may be Wx.

(b) of FIG. 7A illustrates that scan signals Vscan 1 to 4 are sequentially applied to four scan data lines during the first subframe period Subframe 1.

Accordingly, as shown in (c) of FIG. 7A, sixteen light emitting diodes emit light during the first subframe period Subframe 1.

(a) of FIG. 7A illustrates that data signals Vdata 1 to 4 are respectively applied to the four data lines shown in FIG. 6 during the second subframe period Subframe 2.

In the drawing, data signals Vdata 1 to 4 each having one pulse or voltage Vx are respectively applied to four data lines during the second subframe period Subframe 2.

(b) of FIG. 7A illustrates that scan signals Vscan 1 to 4 are sequentially applied to four scan lines during the second subframe period Subframe 2.

Accordingly, as shown in (c) of FIG. 7A, four light emitting diodes in a diagonal orientation emit light during the second subframe period Subframe 2.

(a) of FIG. 7A illustrates that data signals Vdata 1 to 4 are respectively applied to the four data lines shown in FIG. 6 during the third subframe period Subframe 3.

In the drawing, data signals Vdata 1 to 4 each having one pulse or voltage Vx are respectively applied to four data lines during the third subframe period Subframe 3.

(b) of FIG. 7A illustrates that scan signals Vscan 1 to 4 are sequentially applied to four scan lines during the third subframe period Subframe 3.

Accordingly, as shown in (c) of FIG. 7A, four light emitting diodes in a diagonal orientation emit light during the third subframe period Subframe 3.

Figure 7B:
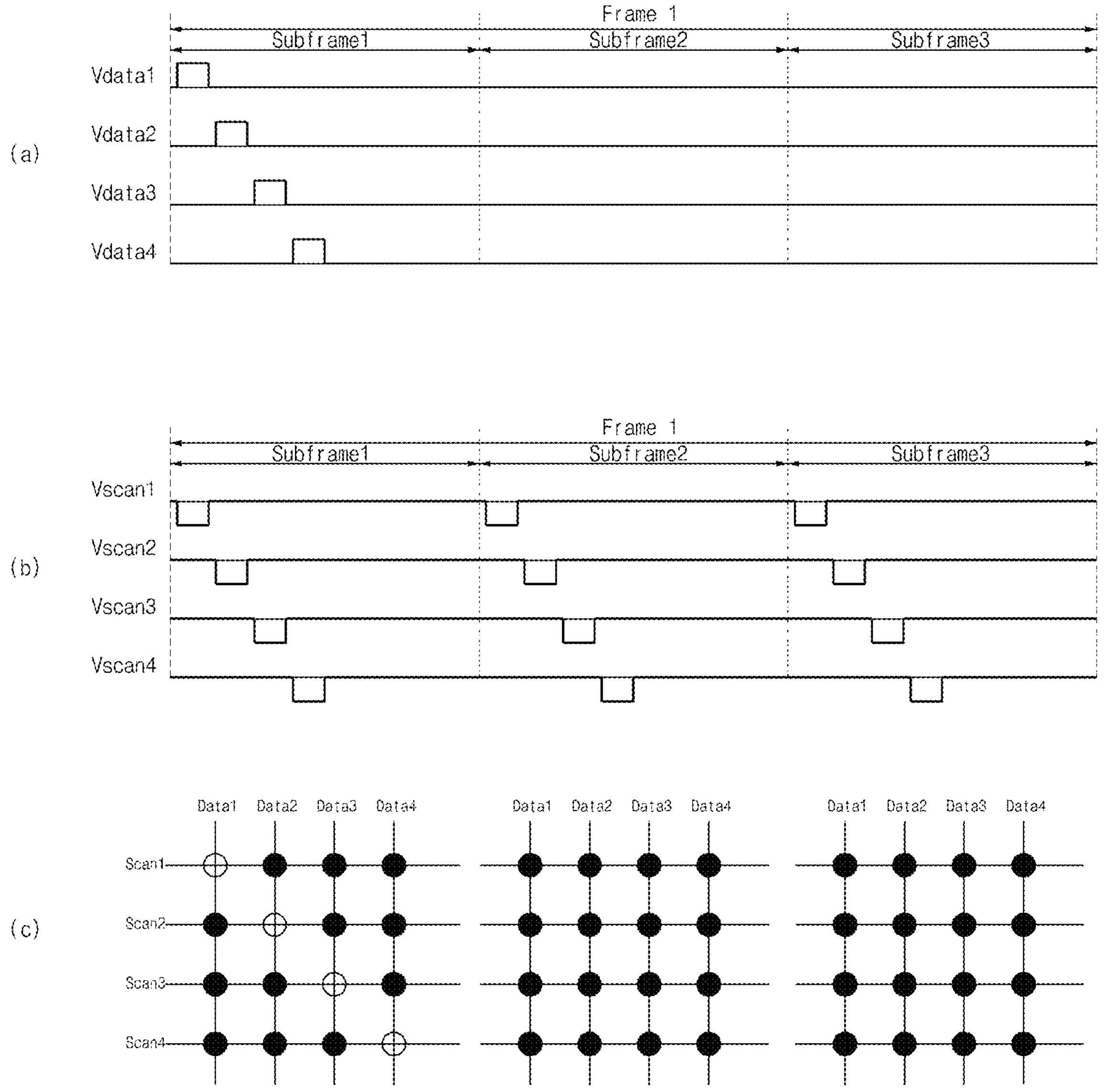

FIG. 7B illustrates an example of a data signal applied when a frame has a second gray level which is lower than the first gray level, during a plurality of subframe periods within a frame period.

(a) of FIG. 7B illustrates that data signals Vdata 1 to 4 each having one pulse or voltage Vx are respectively applied to the four data lines shown in FIG. 6 during the first subframe period Subframe 1 which is one of the plurality of subframe periods Subframes 1 to 3, and that no pulse or voltage Vx is applied during the second subframe period Subframe 2 and the third subframe period Subframe 3.

(b) of FIG. 7B illustrates that scan signals Vscan 1 to 4 are sequentially applied to four scan lines during the plurality of subframe periods Subframes 1 to 3.

Accordingly, as shown in (c) of FIG. 7B, four light emitting diodes in a diagonal orientation emit light during the first subframe period Subframe 1, and all of sixteen light emitting diodes are turned off and emit no light during the second subframe period Subframe 2 and the third subframe period Subframe 3.

As shown in FIG. 7B, when a plurality of light emitting diodes are turned off and emit no light during part of the plurality of subframe periods Subframes 1 to 3, flicker occurs.

Figure 7C:
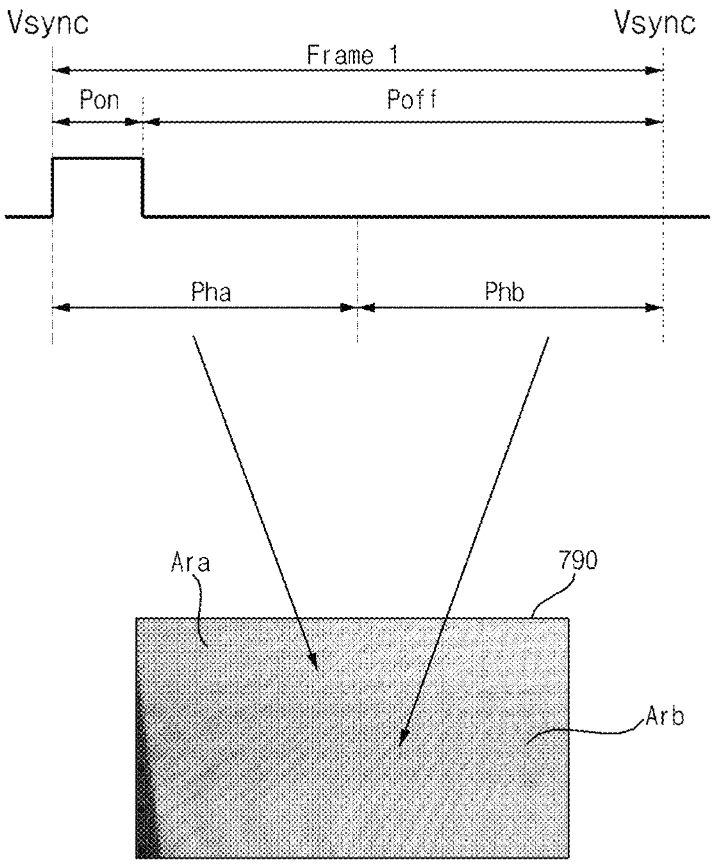

FIG. 7C illustrates an on period Pon in which a plurality of light emitting diodes are turned on and off and an off period Poff off in which a plurality of light emitting diodes are turned off, during a frame period Frame 1 between vertical synchronization signals.

Referring to the drawing, when the frame period Frame 1 is split into an on period Pon in which a plurality of light emitting diodes are turned on and an off period Poff off in which a plurality of light emitting diodes are turned off, an image 790 displayed on the display may be as shown in the drawing.

In particular, the image 790, when perceived by the user's eye, may be split into an area Ara where no flicker occurs and an area Arb where flicker occurs.

The area Ara where no flicker occurs may correspond to the on period Pon in which a plurality of light emitting diodes in the drawing are turned on, and the area Arb where flicker occurs may correspond to the off period Poff in which a plurality of light emitting diodes in the drawing are turned off.

Accordingly, the present disclosure proposes a method of reducing flicker by shortening the off period Poff in which a plurality of light emitting diodes are turned off. This will be described with reference to FIG. 9 and the subsequent drawings.

Figure 8A:
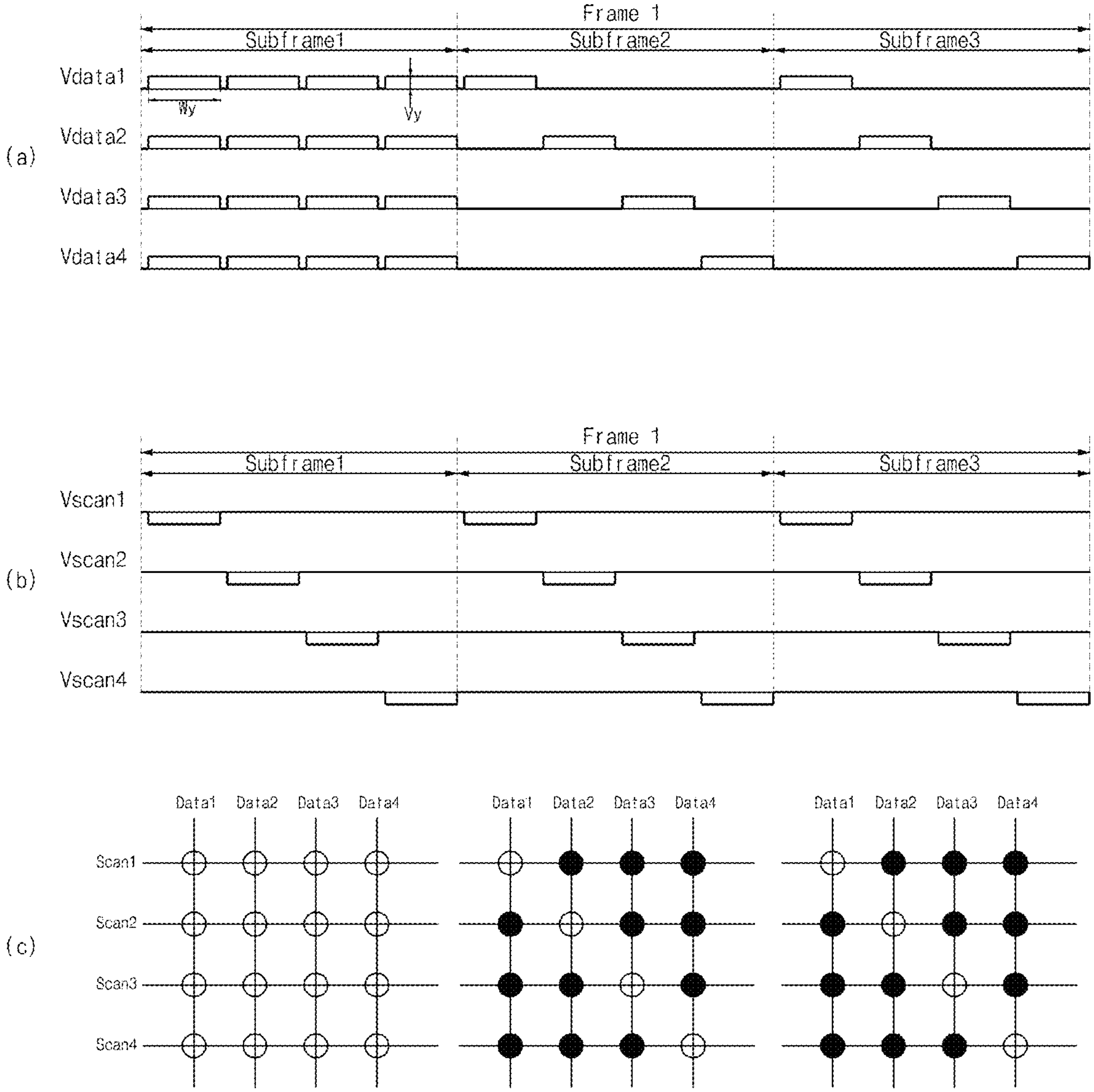

FIG. 8A illustrates another example of a data signal applied when a frame has a first gray level, during a plurality of subframe periods within a frame period.

(a) of FIG. 8A illustrates that data signals Vdata 1 to 4 are respectively applied to the four data lines shown in FIG. 6 during the first subframe period Subframe 1 which is one of the plurality of subframe periods Subframes 1 to 3, and that data signals Vdata 1 to 4 each having one pulse or voltage Vx are respectively applied to the four data lines during the second subframe period Subframe 2 and the third subframe period Subframe 3.

In (a) of FIG. 8A, in comparison with (a) of FIG. 7, data signals Vdata 1 to 4 having a pulse or voltage Vy lower than the voltage Vx of FIG. 7A are applied, and the pulse width Wy may be greater than Wx in FIG. 7A.

In response to this, the pulse width of scan signals Vscan 1 to 4 applied to the plurality of subframes 1 to 3 may also be Wy.

Accordingly, as shown in (c) of FIG. 8A, sixteen light emitting diodes emit light during the first subframe period Subframe 1, and four light emitting diodes in a diagonal orientation emit light during the second subframe period Subframe 2 and the third subframe period Subframe 3.

Figure 8B:
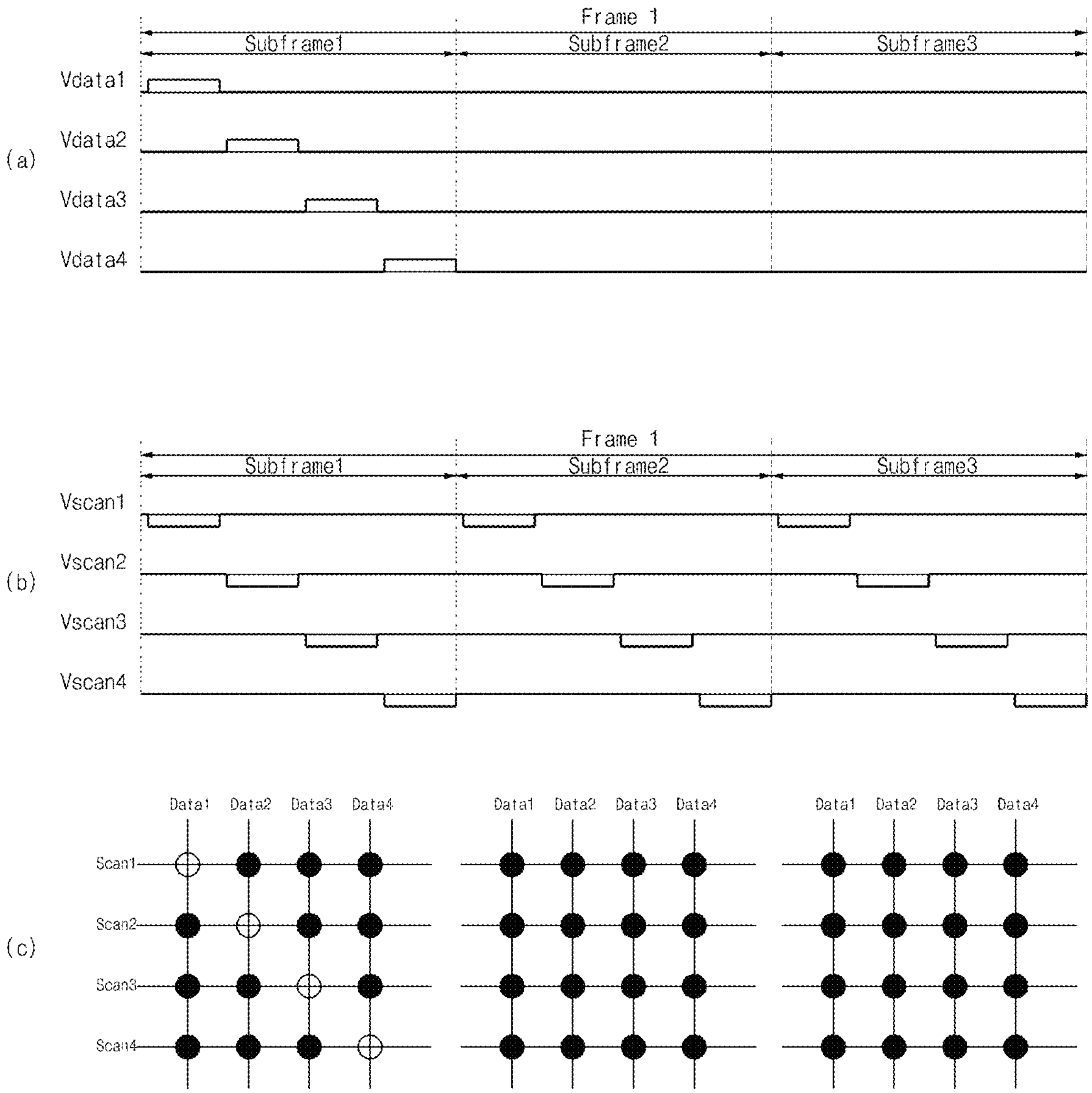

FIG. 8B illustrates another example of a data signal applied when a frame has a second gray level which is lower than the first gray level, during a plurality of subframe periods within a frame period.

(a) of FIG. 8B illustrates that data signals Vdata 1 to 4 each having one pulse or voltage Vy are respectively applied to the four data lines shown in FIG. 6 during the first subframe period Subframe 1 which is one of the plurality of subframe periods Subframes 1 to 3, and that no pulse or voltage Vx is applied during the second subframe period Subframe 2 and the third subframe period Subframe 3.

(b) of FIG. 8B illustrates that scan signals Vscan 1 to 4 are sequentially applied to four scan data lines during the plurality of subframe periods Subframes 1 to 3.

Accordingly, as shown in (c) of FIG. 8B, four light emitting diodes in a diagonal orientation emit light during the first subframe period Subframe 1, and all of sixteen light emitting diodes are turned off and emit no light during the second subframe period Subframe 2 and the third subframe period Subframe 3.

As shown in FIG. 8B, when a plurality of light emitting diodes are turned off and emit no light during part of the plurality of subframe periods Subframes 1 to 3, flicker occurs.

In comparison with FIG. 7B, as shown in FIG. 8B, even if the pulse width of data signals is increased, if the frame has a low gray level, a plurality of light emitting diodes are turned off and emit no light during part of the plurality of subframe periods Subframes 1 to 3, and therefore flicker occurs.

Hence, the present disclosure proposes a method of reducing flicker by shortening the off period Poff in which a plurality of light emitting diodes are turned off. This will be described with reference to FIG. 9 and the subsequent drawings.

Figure 9:
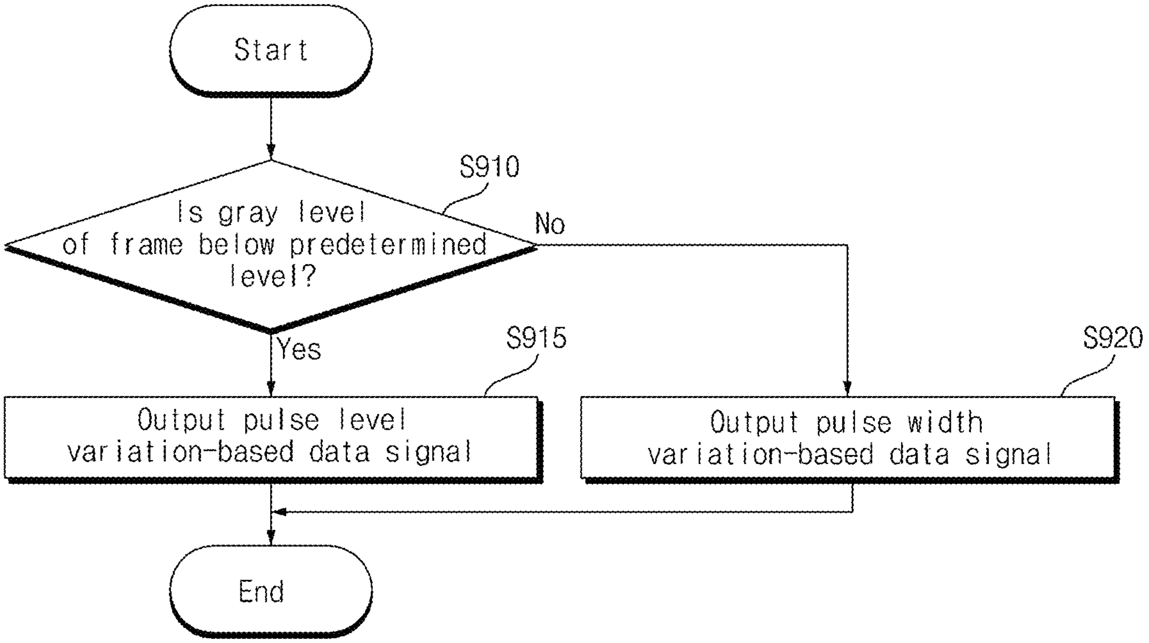
FIG. 9 is a flowchart illustrating an operation method of an image display apparatus according to an embodiment of the present disclosure.

FIG. 9 is a flowchart illustrating an operation method of an image display apparatus according to an embodiment of the present disclosure.

Referring to the drawing, the driving controller 285 in the image display apparatus 100 according to an embodiment of the present disclosure determines whether the gray level of a frame including a plurality of subframes is lower than a predetermined level (S910), and, if so, outputs a data signal based on pulse amplitude modulation to light emitting diodes (S915).

The driving controller 285 receives an image signal from the signal processing device 170, and may calculate the gray level in the frame based on frame data in the image signal.

Moreover, the driving controller 285 may determine whether the gray level in the frame is below a predetermined level, in order to find out whether it is a low gray level.

For example, for 256 levels of gray in total, the driving controller 285 may set the gray level to 64.

In response to the gray level of a frame including a plurality of subframes being below the predetermined level, the driving controller 285 according to an embodiment of the present disclosure outputs a data signal based on pulse amplitude modulation to the light emitting diodes while dividing the gray level of the frame and distributing it across at least part of the subframes. Accordingly, it is possible to efficiently reduce flicker. In particular, flicker can be easily reduced at low gray levels.

Meanwhile, in the 910 step (S910), in response to the gray level of a frame including a plurality of subframes being above the predetermined level, the driving controller 285 outputs a data signal based on pulse width modulation to the light emitting diodes (S920).

Accordingly, for gray levels other than low gray levels, grayscale representation may be performed through a plurality of subframes based on pulse width modulation.

Meanwhile, the level of a data signal outputted from the driving controller 285 when the gray level of the frame is below the predetermined level may be lower than the level of a data signal outputted from the driving controller 285 when the gray level of the frame is above the predetermined level.

Meanwhile, the driving controller 285 may be configured to control the level of a data signal outputted when the gray level of the frame is below the predetermined level to be lower than the level of a data signal outputted when the gray level of the frame is the predetermined level.

That is, the driving controller 285 may be configured to, when the frame has a low gray level below the predetermined level, decrease the level of a data signal as the gray level decreases, in order to divide the gray level of the frame and distribute the divided gray level across at least part of the subframes.

Accordingly, it is possible to efficiently reduce flicker. In particular, flicker can be easily reduced at low gray levels.

Meanwhile, the driving controller 285 may be configured to control the light emitting diodes to emit light during a second number of subframe periods greater than a first number of subframe periods set when the gray level of the frame is below the predetermined level.

For example, the gray level of the frame may be 10, and the number of subframe periods set before the 915 step (S915) may be set to 3 out of 32 which is the total number of subframe periods.

In this regard, in the present disclosure, in response to the gray level of the frame being 10 which is below the predetermined level, the 915 step (S915) may be performed, and the number of subframe periods may be set not to 3 but to 27 out of 32 which is the total number of subframe periods, in order to reduce flicker at low gray levels.

Accordingly, it is possible to efficiently reduce flicker. In particular, flicker can be easily reduced at low gray levels.

In relation to this, the driving controller 285 may be configured to control the light emitting diodes to emit light during a second light emission period longer than a first light emission period set when the gray level of the frame is below the predetermined level.

For example, in response to the gray level of the frame being 10 which is below the predetermined level, the light emission period set before the 915 step may be approximately $3/32$ sec.

In this regard, in the present disclosure, in response to the gray level of the frame being 10 which is below the predetermined level, the 915 step (S915) may be performed, and the light emission period may be set to approximately $27/32$ sec. Accordingly, it is possible to efficiently reduce flicker. In particular, flicker can be easily reduced at low gray levels.

That is, the driving controller 285 according to the present disclosure may be configured to control the light emitting diodes to emit light during the second light emission period, rather than the first light emission period set when the gray level of the frame is below the predetermined level.

In another example, the driving controller 285 according to the present disclosure may be configured to control the light emitting diodes to be turned off during a second non-light emission period, rather than during a first non-light emission period set when the gray level of the frame is below the predetermined level.

Meanwhile, in response to the gray level of the frame being below the predetermined level, the driving controller 285 may output a data signal based on pulse amplitude modulation to the light emitting diodes during each of the second number of subframe periods.

For example, in response to the gray level of the frame being 10 which is below the predetermined level, the driving controller 285 may set the number of subframe periods not to 3 but to 32 which is the total number of subframe periods, and may be configured to control the light emitting diodes to emit light during the 32 subframe periods.

That is, even in response to the gray level of the frame being a low level, the driving controller 285 may be configured to control the light emitting diodes to keep emitting light during a plurality of subframe periods by lowering the pulse level of a data signal. Accordingly, flicker can be easily reduced at low gray levels.

Meanwhile, in response to the gray level of the frame being below the predetermined level, the driving controller 285 may output a data signal of the same level to the light emitting diodes during each of the second number of subframe periods.

For example, in response to the gray level of the frame being 10 which is below the predetermined level, the driving controller 285 may set the number of subframe periods not to 3 but to 32 which is the total number of subframe periods, and may be configured to control the light emitting diodes to emit light during the 32 subframe periods and the level of a data signal applied to each light emitting diode is the same. Accordingly, it is possible to efficiently generate and output a data signal while reducing flicker.

Meanwhile, in response to the gray level of the frame being below the predetermined level, the driving controller 285 may output data signals of different levels to the light emitting diodes during each of the second number of subframe periods.

For example, in response to the gray level of the frame being 10 which is below the predetermined level, the driving controller 285 may set the level of a data signal for a first subframe period, out of a plurality of subframe periods, to a first level, set the level of a data signal for a second subframe period to a second level which is different from the first level, and set the level of a data signal for a third subframe period to a third level which is different from the first level and the second level. Accordingly, flicker can be easily reduced at low gray levels.

Meanwhile, in response to the gray level of the frame being below the predetermined level, the driving controller 285 may output a data signal of the same level to the light emitting diodes during part of each of the second number of subframe periods.

For example, in response to the gray level of the frame being 10 which is below the predetermined level, the driving controller 285 may set the level of a data signal for a first subframe period, out of a plurality of subframe periods, to a first level, set the level of a data signal for a second subframe period to the first level, and set the level of a data signal for a third subframe period to a second level which is different from the first level. Accordingly, flicker can be easily reduced at low gray levels.

Accordingly, it is possible to efficiently reduce flicker. In particular, flicker can be easily reduced at low gray levels.

Meanwhile, in response to the gray level of the frame being below the predetermined level, the driving controller 285 may be configured to control the light emitting diodes to emit light during each of the plurality of subframe periods.

For example, in response to the gray level of the frame being 10 which is below the predetermined level, the driving controller 285 may set the number of subframe periods not to 3 but to 32 which is the total number of subframe periods, and may be configured to control the light emitting diodes to emit light during the 32 subframe periods. Accordingly, it is possible to efficiently generate and output a data signal while reducing flicker.

Meanwhile, in response to the gray level of the frame being below the predetermined level, the driving controller 285 may output a data signal based on pulse amplitude modulation to the light emitting diodes during each of the plurality of subframe periods.

For example, in response to the gray level of the frame being 10 which is below the predetermined level, the driving controller 285 may output a data signal based on pulse amplitude modulation to the light emitting diodes during the entire 32 subframe periods. Accordingly, it is possible to efficiently reduce flicker. In particular, flicker can be easily reduced at low gray levels.

Meanwhile, in response to the gray level of the frame being below the predetermined level, the driving controller 285 may output a data signal of the same level to the light emitting diodes during each of the plurality of subframe periods.

For example, in response to the gray level of the frame being 10 which is below the predetermined level, the driving controller 285 may output a data signal of the same level to the light emitting diodes during the entire 32 subframe periods. Accordingly, it is possible to efficiently reduce flicker. In particular, flicker can be easily reduced at low gray levels.

Meanwhile, in response to the gray level of the frame being below the predetermined level, the driving controller 285 may output data signals of different levels to the light emitting diodes during part of each of the plurality of subframe periods.

For example, in response to the gray level of the frame being 10 which is below the predetermined level, the driving controller 285 may output data signals of different levels to the light emitting diodes during the entire 32 subframe periods. Accordingly, it is possible to efficiently reduce flicker. In particular, flicker can be easily reduced at low gray levels.

Meanwhile, in response to the gray level of the frame being below the predetermined level, the driving controller 285 may output a data signal of the same level to the light emitting diodes during part of each of the plurality of subframe periods.

For example, in response to the gray level of the frame being 10 which is below the predetermined level, the driving controller 285 may output a data signal of a first level to the light emitting diodes during part of the entire 32 subframe periods and output a data signal of a different level from the first level to the light emitting diodes during another part of the 32 subframe periods. Accordingly, it is possible to efficiently reduce flicker. In particular, flicker can be easily reduced at low gray levels.

Meanwhile, in response to the gray level of the frame being above the predetermined level, the driving controller 285 may output a data signal based on pulse width modulation to the light emitting diodes during each of the plurality of subframe periods, and in response to the gray level of the frame being below the predetermined level, the driving controller 285 may output a data signal based on pulse amplitude modulation to the light emitting diodes during each of the plurality of subframe periods.

For example, in response to the gray level of the frame being 150 which is above the predetermined level, the driving controller 285 may output a data signal based on pulse width modulation to the light emitting didoes during the entire 32 subframe periods.

Meanwhile, in response to the gray level of the frame being 10 which is below the predetermined level, the driving controller 285 may output a data signal based on pulse amplitude modulation to the light emitting diodes during the entire 32 subframe periods.

Accordingly, the data signal driving scheme may be varied with gray level, and, as a result, flicker can be efficiently reduced. In particular, flicker can be easily reduced at low gray levels.

FIGS. 10 to 16B are diagrams referred to in the description of FIG. 9.

Figure 10:
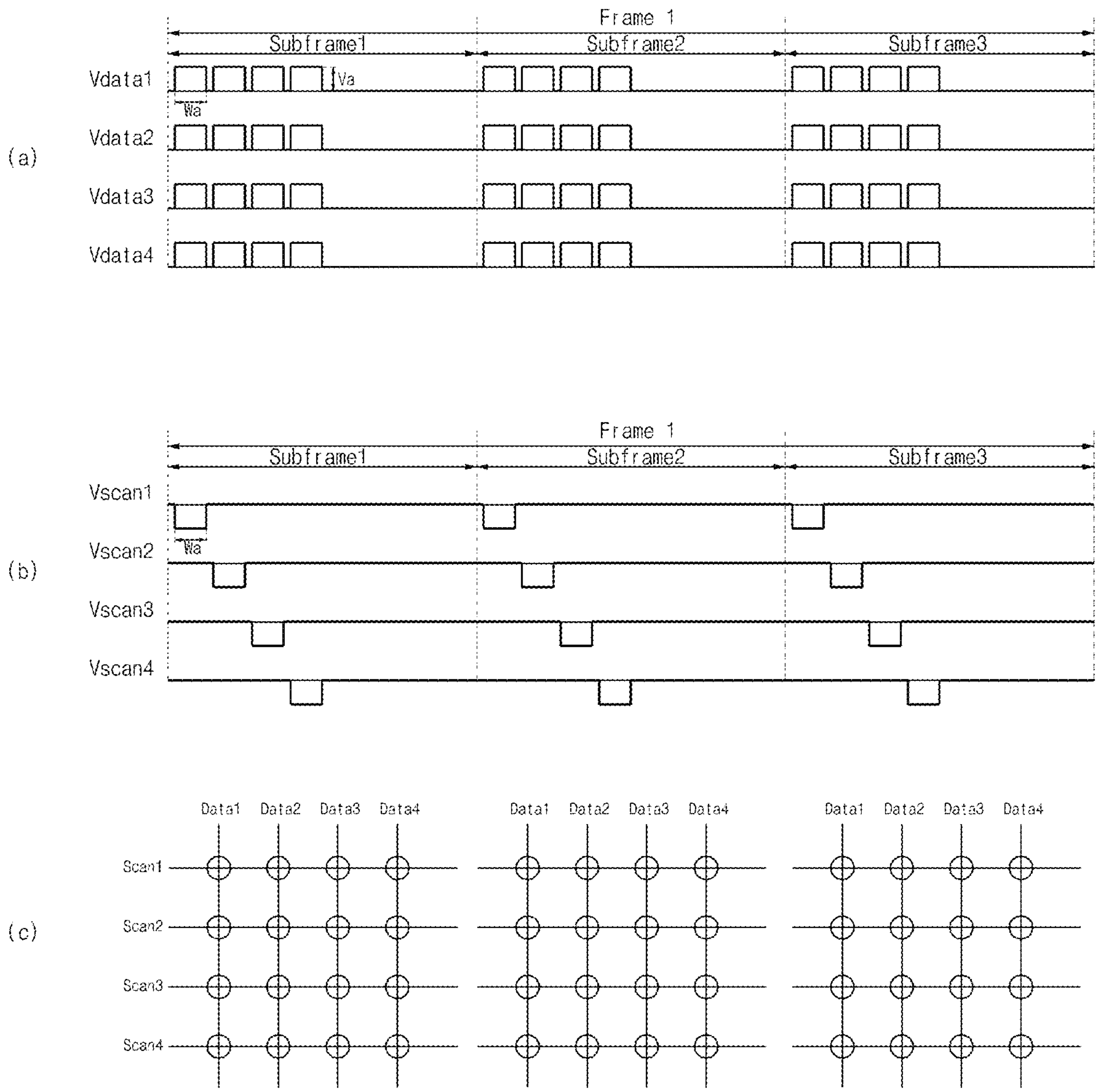
FIGS. 10 to 16B are diagrams referred to in the description of FIG. 9.

FIG. 10 illustrates an example of a data signal applied when the gray level of a frame is above a predetermined level, during a plurality of subframe periods within a frame period.

Referring to the drawing, a plurality of subframe periods Subframes 1 to 3 may be provided within a frame period Frame 1.

Although the drawing illustrates three subframe periods Subframes 1 to 3 within a frame period Frame 1 for convenience of explanation, many variations may be made.

(a) of FIG. 10 illustrates that data signals Vdata 1 to 4 are respectively applied to the four data lines shown in FIG. 6 during the first subframe period Subframe 1, the second subframe period Subframe 2, and the third subframe period Subframe 3, which are the plurality of subframe periods Subframes 1 to 3.

In the drawing, data signals Vdata 1 to 4 each having four pulses or voltages Vx are respectively applied to four data lines during the plurality of subframe periods Subframes 1 to 3.

In this case, the pulse width of the data signals Vdata 1 to 4 may be Wa.

Meanwhile, since the gray level of the frame is above the predetermined level, the driving controller 285 may output a data signal based on pulse width modulation to light emitting diodes.

(b) of FIG. 10 illustrates that scan signals Vscan 1 to 4 are sequentially applied to four scan data lines during the plurality of subframe periods Subframes 1 to 3.

Accordingly, as shown in (c) of FIG. 10, sixteen light emitting diodes emit light during the plurality of subframe periods Subframes 1 to 3.

Figure 11:
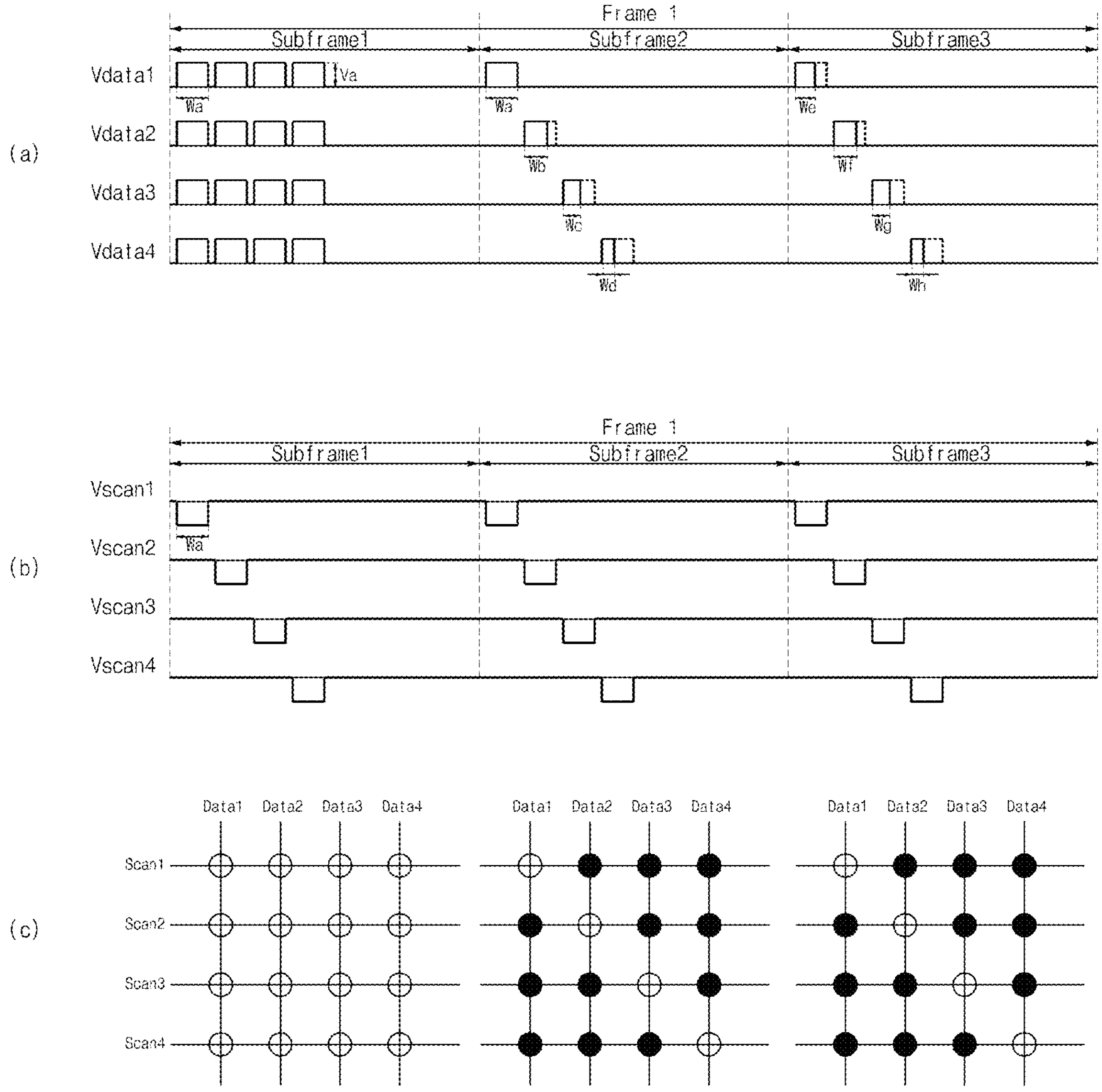

FIG. 11 illustrates an example of a data signal applied when a frame has a first gray level which is above a predetermined level, during a plurality of subframe periods within a frame period.

(a) of FIG. 11 illustrates that data signals Vdata 1 to 4 each having one pulse or voltage Va are respectively applied to the four data lines shown in FIG. 6 during the first subframe period Subframe 1 which is one of the plurality of subframe periods Subframes 1 to 3.

Meanwhile, data signals Vdata 1 to 4 each having one pulse or voltage Va may be respectively applied to four data lines during the second subframe period Subframe 2, and data signals Vdata 1 to 4 each having one pulse or voltage Va may be respectively applied to four data lines during the third subframe period Subframe 3.

Meanwhile, since the gray level of the frame is above the predetermined level, the driving controller 285 may output a data signal based on pulse width modulation to light emitting diodes during the plurality of subframe periods Subframes 1 to 3.

In the drawing, the pulse width of the data signals Vdata 1 to 4 may be respectively varied to Wa, Wb, Wc, and Wd during the second subframe period Subframe 2, and the pulse width of the data signals Vdata 1 to 4 may be respectively varied to We, Wf, Wg, and Wh during the third subframe period Subframe 3.

Meanwhile, as shown in the drawing, the pulse level of the data signals Vdata 1 to 4 may be constant during the plurality of subframe periods Subframes 1 to 3.

(b) of FIG. 11 illustrates that scan signals Vscan 1 to 4 are sequentially applied to four scan lines during the plurality of subframe periods Subframes 1 to 3.

Accordingly, sixteen light emitting diodes emit light as shown in (c) of FIG. 11 during the first subframe period Subframe 1, four light emitting diodes in a diagonal orientation emit light as shown in (c) of FIG. 11 during the second subframe period Subframe 2, and four light emitting diodes in a diagonal orientation emit light as shown in (c) of FIG. 11 during the third subframe period Subframe 3.

Figure 12A:
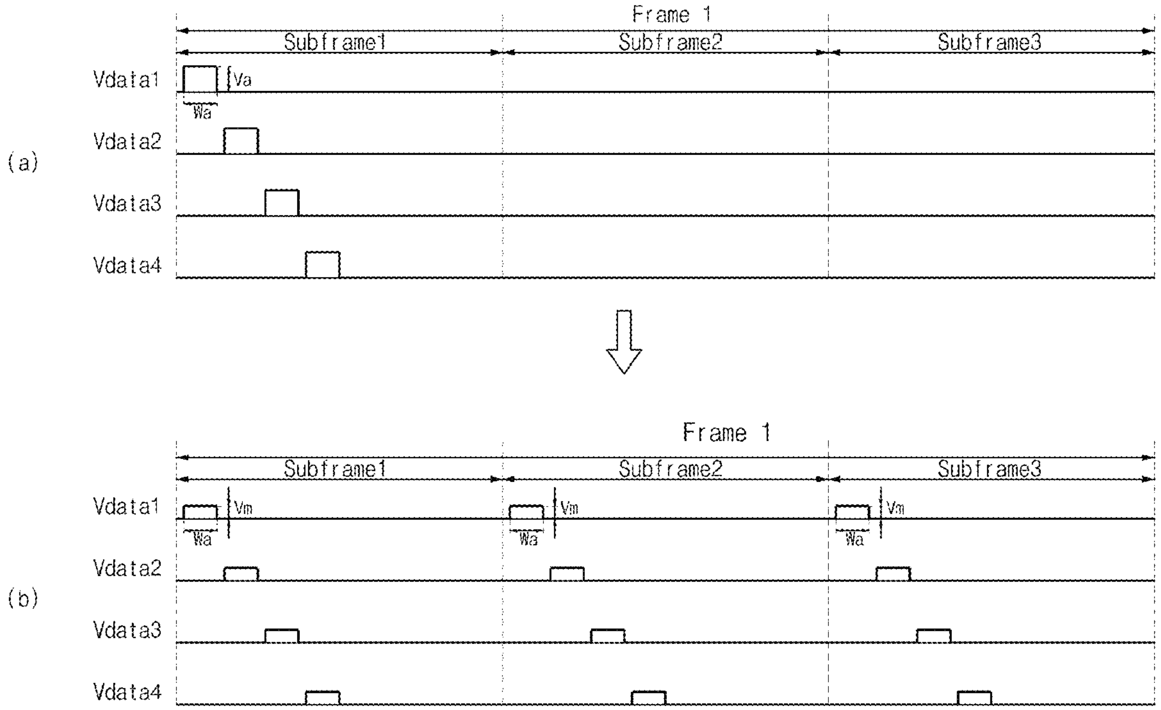

FIG. 12A illustrates an example of a data signal applied when a frame has a second gray level which is below a predetermined level, during a plurality of subframe periods within a frame period.

Referring to the drawing, (a) of FIG. 12A illustrates a driving method related to the present disclosure in which, when the gray level of a frame is below a predetermined level, a data signal based on pulse width modulation is outputted.

That is, (a) of FIG. 12A illustrates that data signals Vdata 1 to 4 each having one pulse or voltage Va are respectively applied to the four data lines shown in FIG. 6 during the first subframe period Subframe 1 which is one of the plurality of subframe periods Subframes 1 to 3, and no pulse or voltage Va is applied during the second subframe period Subframe 2 and the third subframe period Subframe 3.

As shown in (a) of FIG. 12A, when a plurality of light emitting diodes are turned off and emit no light during part of the plurality of subframe periods Subframes 1 to 3, flicker occurs.

In this regard, in the present disclosure, when the gray level of the frame is below the predetermined level, a data signal based on pulse amplitude modulation, rather than a data signal based on pulse width modulation, is outputted.

Referring to the drawing, (b) of FIG. 12A illustrates that, when the gray level of the frame is below the predetermined level, the driving controller 285 according to an embodiment of the present disclosure outputs a data signal based on pulse amplitude modulation.

As shown in (b) of FIG. 12A, the driving controller 285 according to an embodiment of the present disclosure may be configured to control data signals Vdata 1 to 4 each having one pulse or voltage Vm to be respectively applied to four data lines during the first subframe period Subframe 1, the second subframe period Subframe 2, and the third subframe period Subframe 3 which are the plurality of subframe periods Subframes 1 to 3.

In this case, the level of the voltage Vm may be lower than the voltage Va in (a) of FIG. 12A.

In this manner, in response to the gray level of a frame being below a predetermined level, the gray level of the frame is split and distributed across at least some subframes, and a data signal based on pulse amplitude modulation is outputted to light emitting diodes, thereby shortening the non-light emission period and, as a result, easily reducing flicker at low gray levels.

Figure 12B:
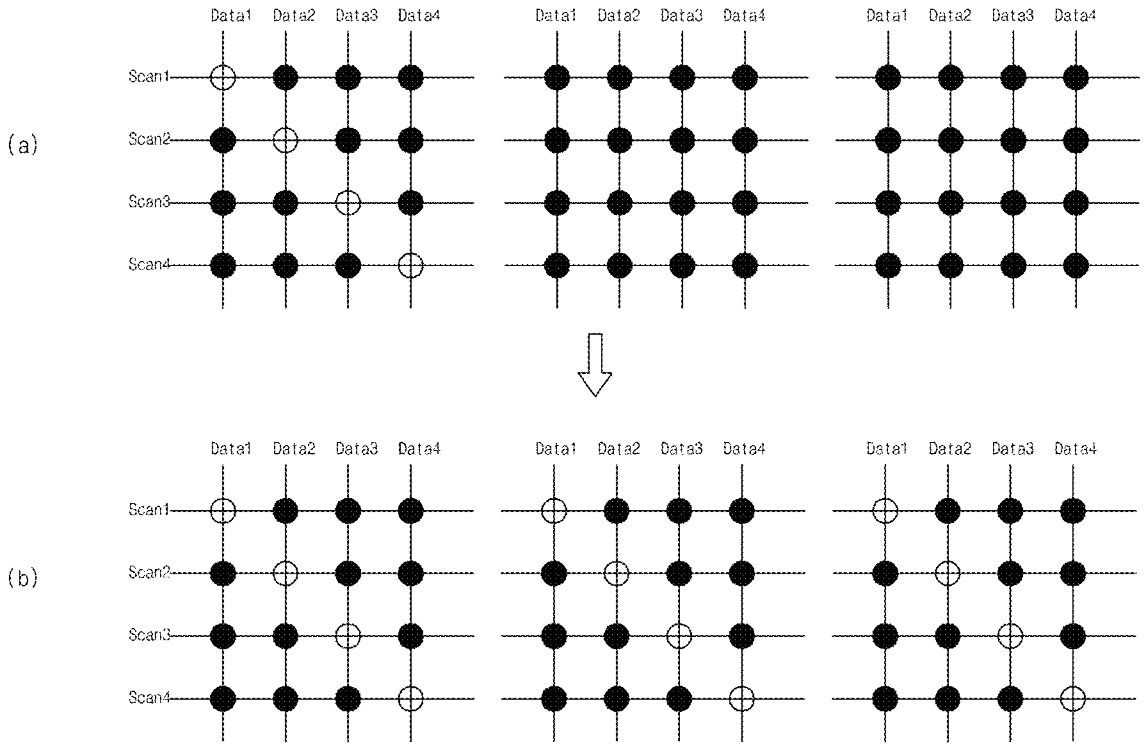

FIG. 12B is a diagram illustrating how light emitting diodes emit light according to each driving scheme of FIG. 12A.

(a) of FIG. 12B illustrates that, in response to a data signal in (a) of FIG. 12A, four light emitting diodes in a diagonal orientation emit light during the first subframe period Subframe 1, and sixteen light emitting diodes are all turned off and emit no light during the second subframe period Subframe 2 and the third subframe period Subframe 3.

(b) of FIG. 12B illustrates that, in response to a data signal in (b) of FIG. 12A, four light emitting diodes in a diagonal orientation emit light during the first subframe period Subframe 1, the four light emitting diodes in the diagonal orientation emit light during the second subframe period Subframe 2, and the four light emitting diodes in the diagonal orientation emit light during the third subframe period Subframe 3.

Since the four light emitting diodes emit light during the plurality of subframe periods, flicker can be easily reduced at low gray levels.

Figure 13A:
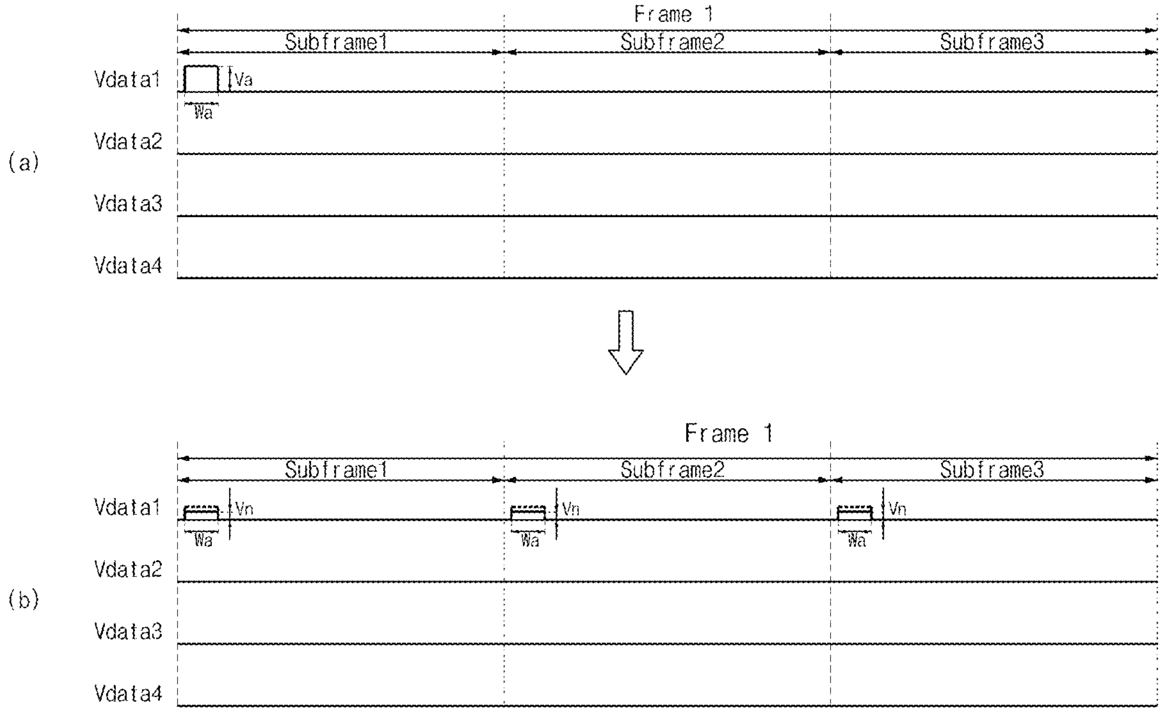

FIG. 13A illustrates an example of a data signal applied when a frame has a third gray level which is below a predetermined level, during a plurality of subframe periods within a frame period.

Referring to the drawing, (a) of FIG. 13A illustrates a driving method related to the present disclosure in which, when the gray level of a frame is below a predetermined level, a data signal based on pulse width modulation is outputted.

That is, (a) of FIG. 13A illustrates that a data signal Vdata 1 having one pulse or voltage Va is applied to a first data line, which is one of the four data lines shown in FIG. 6, during the first subframe period Subframe 1 which is one of the plurality of subframe periods Subframes 1 to 3, and no pulse or voltage Va is applied during the second subframe period Subframe 2 and the third subframe period Subframe 3.

As shown in (a) of FIG. 13A, when a plurality of light emitting diodes are turned off and emit no light during part of the plurality of subframe periods Subframes 1 to 3, flicker occurs.

(b) of FIG. 13A illustrates that, when the gray level of the frame is below the predetermined level, the driving controller 285 according to an embodiment of the present disclosure outputs a data signal based on pulse amplitude modulation.

As shown in (b) of FIG. 13A, the driving controller 285 according to an embodiment of the present disclosure may be configured to control a data signal Vdata 1 having one pulse or voltage Vn to be applied to a first data line during the first subframe period Subframe 1, the second subframe period Subframe 2, and the third subframe period Subframe 3 which are the plurality of subframe periods Subframes 1 to 3.

In this case, the level of the voltage Vn may be lower than the voltage Va in (a) of FIG. 13A.

Meanwhile, in comparison with (b) of FIG. 12A, since the third gray level is lower than the second gray level, the level of the voltage Vn may be lower than the level of the voltage Vm in (b) of FIG. 12A.

Accordingly, the data signal driving scheme may be varied with gray level, and, as a result, flicker can be efficiently reduced. In particular, flicker can be easily reduced at low gray levels.

Figure 13B:
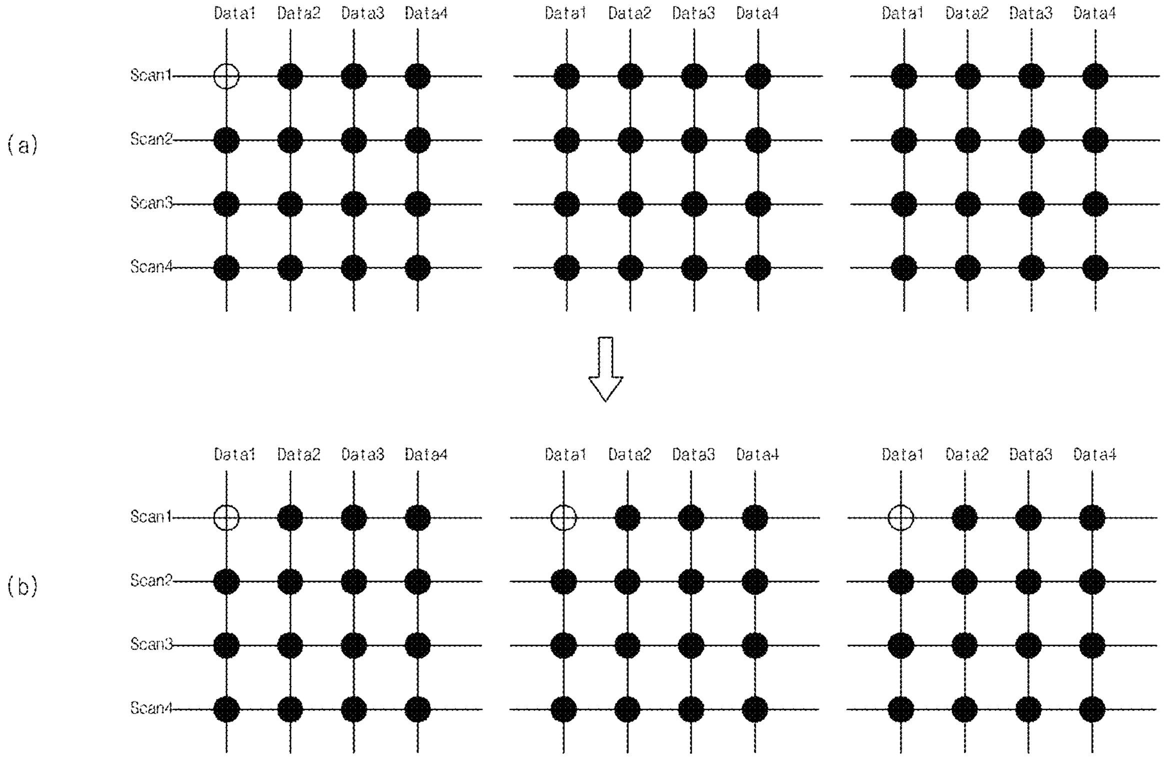

FIG. 13B is a diagram illustrating how light emitting diodes emit light according to each driving scheme of FIG. 13A.

(a) of FIG. 13B illustrates that, in response to a data signal in (a) of FIG. 13A, the light emitting diode at position (1,1), out of sixteen light emitting diodes in a 4×4 matrix, emits light during the first subframe period Subframe 1, and the sixteen light emitting diodes are all turned off and emit no light during the second subframe period Subframe 2 and the third subframe period Subframe 3.

(b) of FIG. 13B illustrates that, in response to a data signal in (b) of FIG. 13A, the light emitting diode at position (1,1), out of sixteen light emitting diodes in a 4×4 matrix, emits light during the first subframe period Subframe 1, the light emitting diode at position (1,1), out of the sixteen light emitting diodes in the 4×4 matrix, emits light during the second subframe period Subframe 2, and the light emitting diode at position (1,1), out of the sixteen light emitting diodes in the 4×4 matrix, emits light during the third subframe period Subframe 3.

Since the light emitting diode at position (1,1) emits light during the plurality of subframe periods, flicker can be easily reduced at low gray levels.

Figure 14A:
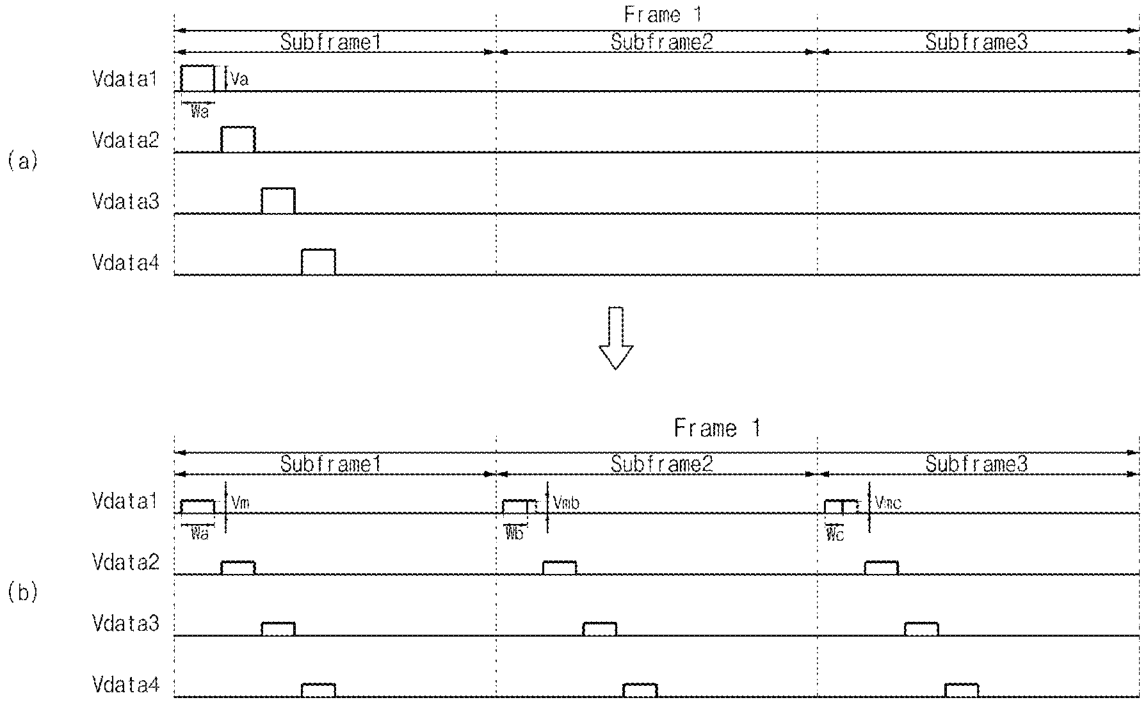

FIG. 14A illustrates another example of a data signal applied when a frame has a second gray level which is below a predetermined level, during a plurality of subframe periods within a frame period.

Referring to the drawing, (a) of FIG. 14A illustrates a driving method related to the present disclosure, which corresponds to (a) of FIG. 12A.

(b) of FIG. 14A illustrates that, when the gray level of the frame is below the predetermined level, the driving controller 285 according to an embodiment of the present disclosure outputs a data signal based on pulse amplitude modulation.

As shown in (b) of FIG. 14A, the driving controller 285 according to an embodiment of the present disclosure may be configured to control data signals Vdata 1 to 4 each having one pulse or voltage Vm, Vmb, and Vmc to be respectively applied to four data lines during the first subframe period Subframe 1, the second subframe period Subframe 2, and the third subframe period Subframe 3 which are the plurality of subframe periods Subframes 1 to 3.

In this case, the driving controller 285 may be configured to control data signals of different voltages Vm, Vmb, and Vmc to be applied during each subframe period. Accordingly, flicker can be easily reduced at low gray levels.

Figure 14B:
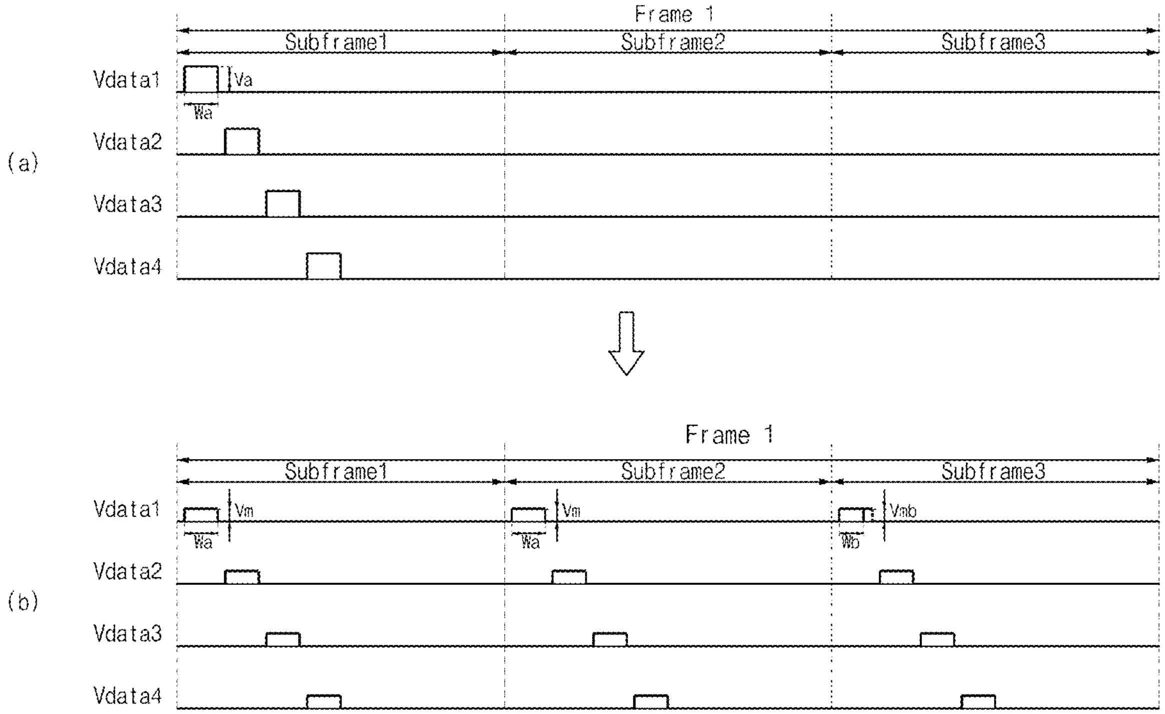

FIG. 14B illustrates yet another example of a data signal applied when a frame has a second gray level which is below a predetermined level, during a plurality of subframe periods within a frame period.

Referring to the drawing, (a) of FIG. 14B illustrates a driving method related to the present disclosure, which corresponds to (a) of FIG. 12A.

As shown in (b) of FIG. 14B, the driving controller 285 according to an embodiment of the present disclosure may be configured to control data signals Vdata 1 to 4 each having one pulse or voltage Vm, Vmb, and Vmc to be respectively applied to four data lines during the first subframe period Subframe 1, the second subframe period Subframe 2, and the third subframe period Subframe 3 which are the plurality of subframe periods Subframes 1 to 3.

In this case, the driving controller 285 may be configured to control a data signal of the same level voltage Vm to be applied during the first subframe period and the second subframe period which are part of the plurality of subframe periods.

Also, the driving controller 285 may be configured to control a data signal of a different level voltage Vmb to be applied to the third subframe period which is another part of the plurality of subframe periods. Accordingly, flicker can be easily reduced at low gray levels.

Figure 15A:
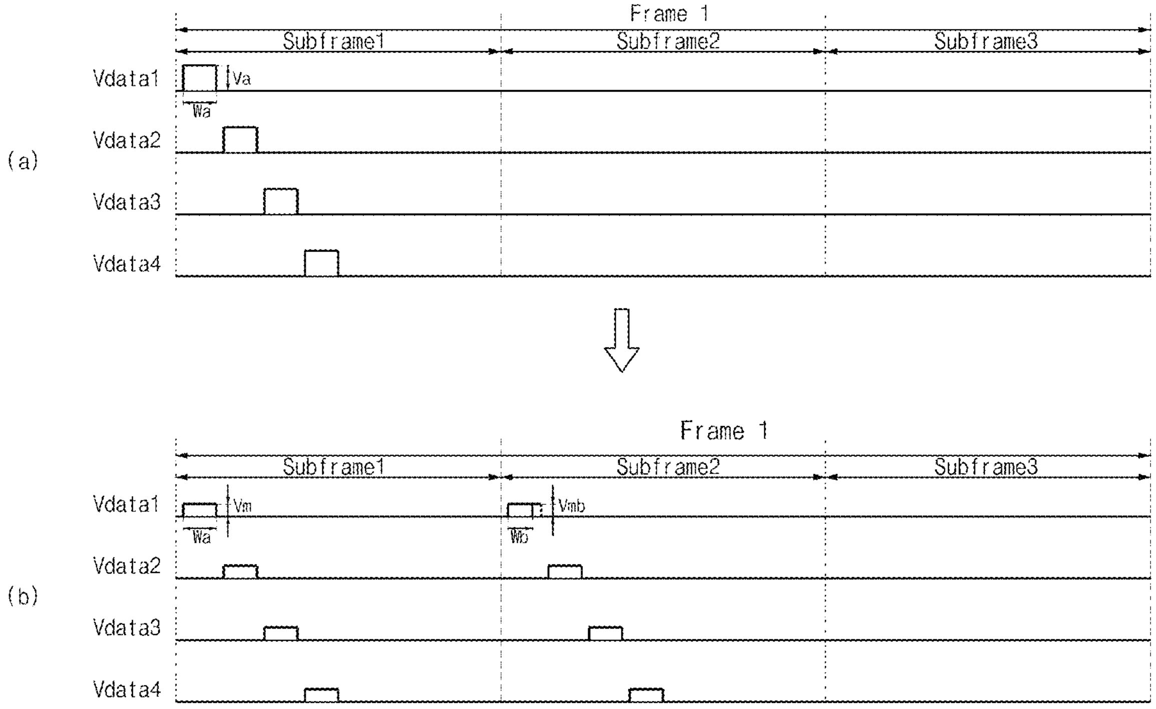

FIG. 15A illustrates a further example of a data signal applied when a frame has a second gray level which is below a predetermined level, during a plurality of subframe periods within a frame period.

Referring to the drawing, (a) of FIG. 15A illustrates a driving method related to the present disclosure, which corresponds to (a) of FIG. 12A.

Referring to the drawing, (b) of FIG. 15A illustrates that, when the gray level of the frame is below the predetermined level, the driving controller 285 according to an embodiment of the present disclosure outputs a data signal based on pulse amplitude modulation during part of the plurality of subframe periods.

As shown in (b) of FIG. 15A, the driving controller 285 according to an embodiment of the present disclosure may be configured to control data signals Vdata 1 to 4 each having one pulse or voltage Vm and Vmb to be respectively applied to four data lines during the first subframe period Subframe 1 and the second subframe period Subframe 2 which are part of the plurality of subframe periods Subframes 1 to 3.

In this case, the level of the voltage Vm and Vmb may be lower than the voltage Va in (a) of FIG. 15A.

Meanwhile, the driving controller 285 according to an embodiment of the present disclosure may be configured to control data signals Vdata 1 to 4 having a pulse or voltage Vm and Vmb to not be outputted during the third subframe period Subframe 3 which is part of the plurality of subframe periods Subframes 1 to 3.

That is, in comparison with FIG. 12A, a plurality of light emitting diodes may be made to emit light, not during the entire plurality of subframe periods but during most of the plurality of subframe periods, and a plurality of light emitting diodes may be made to emit no light during only part of these subframe periods.

Meanwhile, if the total number of subframes is 32, the driving controller 285 according to an embodiment of the present disclosure may be configured to emit light in 25 subframes which is approximately 80% corresponding to a first proportion, and emit no light in 10 subframes which is approximately 20%.

Meanwhile, the driving controller 285 may vary the first proportion based on design specifications such as the number of subframes.

Figure 15B:
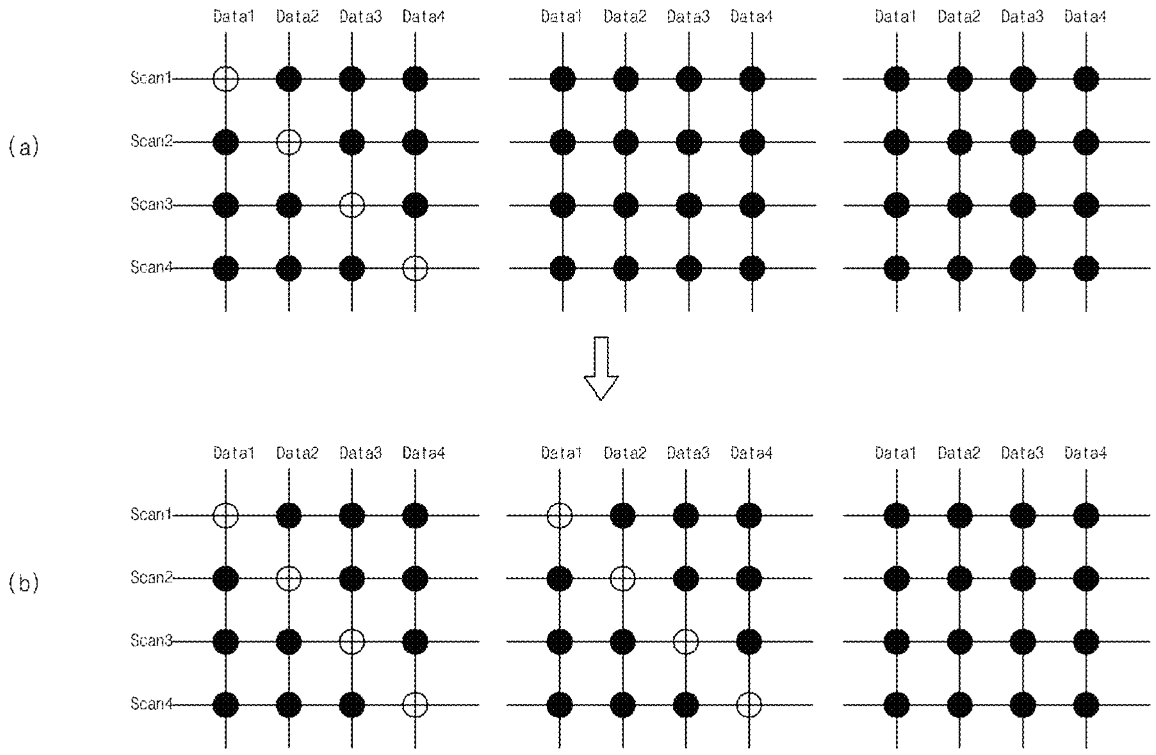

FIG. 15B is a diagram illustrating how light emitting diodes emit light according to each driving scheme of FIG. 15A.

(a) of FIG. 15B illustrates that, in response to a data signal in (a) of FIG. 15A, four light emitting diodes in a diagonal orientation emit light during the first subframe period Subframe 1, and sixteen light emitting diodes are all turned off and emit no light during the second subframe period Subframe 2 and the third subframe period Subframe 3.

(b) of FIG. 15B illustrates that, in response to a data signal in (b) of FIG. 15A, four light emitting diodes in a diagonal orientation emit light during the first subframe period Subframe 1, the four light emitting diodes in the diagonal orientation emit light during the second subframe period Subframe 2, and sixteen light emitting diodes are all turned off and emit no light during the third subframe period Subframe 3.

Since the four light emitting diodes emit light during the first subframe period and the second subframe period which are part of the plurality of subframe periods, flicker can be easily reduced at low gray levels.

Figure 16A:
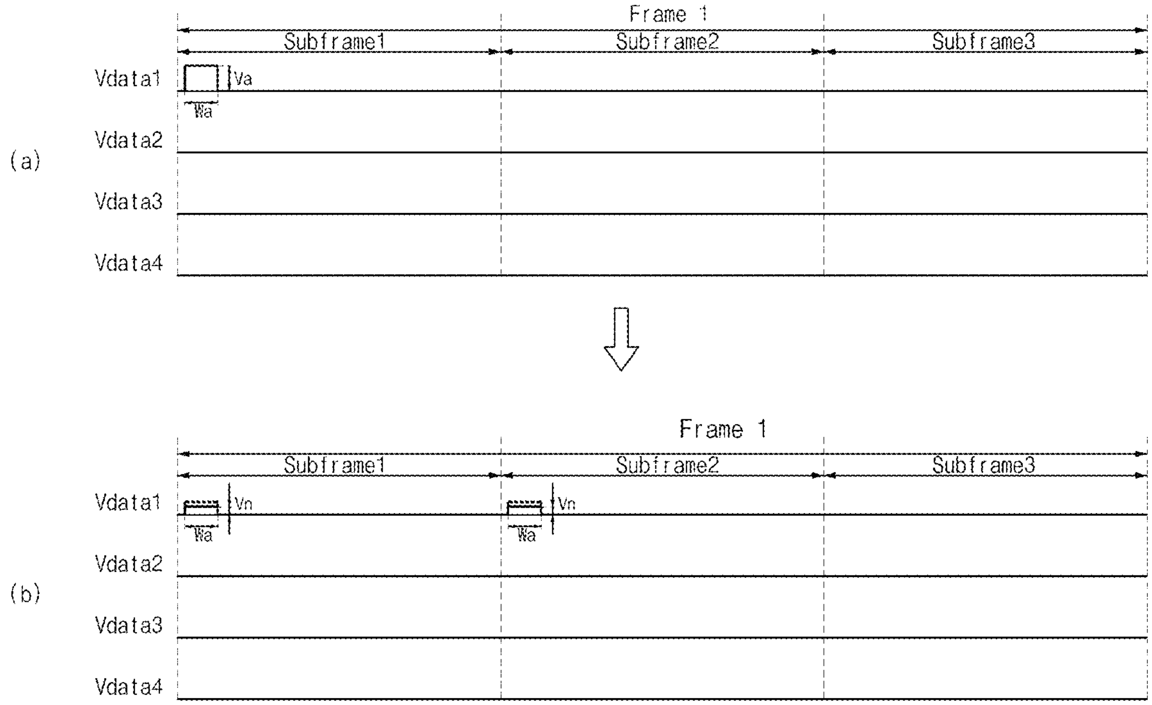

FIG. 16A illustrates a further example of a data signal applied when a frame has a third gray level which is below a predetermined level, during a plurality of subframe periods within a frame period.

Referring to the drawing, (a) of FIG. 16A illustrates a driving method related to the present disclosure, which corresponds to (a) of FIG. 13A.

Referring to the drawing, (b) of FIG. 16A illustrates that, when the gray level of the frame is below the predetermined level, the driving controller 285 according to an embodiment of the present disclosure outputs a data signal based on pulse amplitude modulation during part of the plurality of subframe periods.

As shown in (b) of FIG. 16A, the driving controller 285 according to an embodiment of the present disclosure may be configured to control a data signal Vdata 1 having one pulse or voltage Vn to be applied to a first data line during the first subframe period Subframe if and the second subframe period Subframe 2 which are part of the plurality of subframe periods Subframes 1 to 3.

In this case, the level of the voltage Vn may be lower than the voltage Va in (a) of FIG. 16A.

Meanwhile, the driving controller 285 according to an embodiment of the present disclosure may be configured to control data signals Vdata 1 to 4 having a pulse or voltage Vn to not be outputted during the third subframe period Subframe 3 which is part of the plurality of subframe periods Subframes 1 to 3.

That is, in comparison with FIG. 13A, a plurality of light emitting diodes may be made to emit light, not during the entire plurality of subframe periods but during most of the plurality of subframe periods, and a plurality of light emitting diodes may be made to emit no light during only part of these subframe periods. Flicker can be reduced in this manner as well.

Figure 16B:
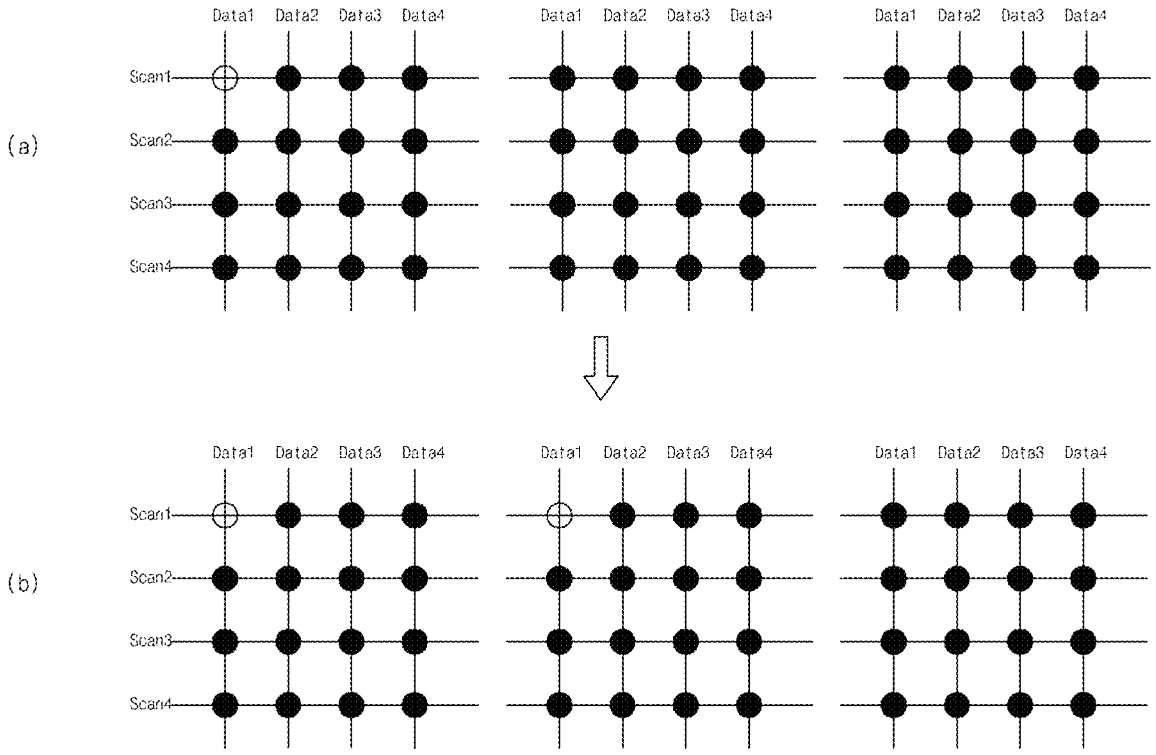

FIG. 16B is a diagram illustrating how light emitting diodes emit light according to each driving scheme of FIG. 16A.

(a) of FIG. 16B illustrates that, in response to a data signal in (a) of FIG. 16A, the light emitting diode at position (1,1), out of sixteen light emitting diodes in a 4×4 matrix, emits light during the first subframe period Subframe 1, and the sixteen light emitting diodes are all turned off and emit no light during the second subframe period Subframe 2 and the third subframe period Subframe 3.

(b) of FIG. 16B illustrates that, in response to a data signal in (b) of FIG. 16A, the light emitting diode at position (1,1), out of sixteen light emitting diodes in a 4×4 matrix, emits light during the first subframe period Subframe 1, the light emitting diode at position (1,1), out of the sixteen light emitting diodes in the 4×4 matrix, emits light during the second subframe period Subframe 2, and the sixteen light emitting diodes are all turned off and emit no light during the third subframe period Subframe 3.

Since the light emitting diode at position (1,1) emits light during the first subframe period and the second subframe period which are part of the plurality of subframe periods, flicker can be easily reduced at low gray levels.

On the one hand, in response to the gray level of a frame including a plurality of subframes being above a predetermined level, the driving controller 285 according to an embodiment of the present disclosure may output a data signal based on pulse width modulation and may be configured to control the level of a data signal supplied to a red light emitting diode to be lower than the level of a data signal supplied to a green light emitting diode or a blue light emitting diode. Accordingly, a data signal corresponding to a light emitting diode can be outputted, and furthermore uniform colors can be rendered.

On the other hand, in response to the gray level of a frame including a plurality of subframes being below the predetermined level, the driving controller 285 according to an embodiment of the present disclosure may output a data signal based on pulse amplitude modulation and may be configured to control the level of a data signal supplied to a red light emitting diode to be lower than the level of a data signal supplied to a green light emitting diode or a blue light emitting diode. Accordingly, a data signal corresponding to a light emitting diode can be outputted, and furthermore uniform colors can be rendered.

Meanwhile, in response to the gray level of a frame including a plurality of subframes being a first level below the predetermined level, the driving controller 285 according to an embodiment of the present disclosure may be configured to control the number of subframes during which the red light emitting diode emits light to be less than or equal to the number of subframes during which the green light emitting diode or the blue light emitting diode emits light.

For example, if the gray level of red within a frame including a plurality of subframes is the first level below the predetermined level, the driving controller 285 may set the number of subframes during which a red light emitting diode emits light to 25 out of 32.

Meanwhile, if the gray level of green within a frame including a plurality of subframes is the first level below the predetermined level, the driving controller 285 may set the number of subframes during which a green light emitting diode emits light to 27 out of 32.

Meanwhile, if the gray level of blue within a frame including a plurality of subframes is the first level below the predetermined level, the driving controller 285 may set the number of subframes during which a blue light emitting diode emits light to 27 out of 32.

Accordingly, a data signal corresponding to a light emitting diode can be outputted, and furthermore uniform colors can be rendered.

As described above, an image display apparatus according to an embodiment of the present disclosure comprises: a panel with a plurality of light emitting diodes; and a driving controller configured to output a scan signal to the plurality of light emitting diodes during each of a plurality of subframe periods, wherein, in response to the gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes. Accordingly, it is possible to efficiently reduce flicker. In particular, flicker can be easily reduced at low gray levels.

Meanwhile, the level of a data signal outputted by the driving controller when the gray level of the frame is below the predetermined level may be less than the level of a data signal outputted by the driving controller when the gray level of the frame is above the predetermined level. Accordingly, it is possible to efficiently reduce flicker. In particular, flicker can be easily reduced at low gray levels.

Meanwhile, the driving controller may control a level of a data signal when the gray level of the frame is a first level below the predetermined level, to be lower than level of a data signal when the gray level of the frame is the predetermined level. Accordingly, it is possible to efficiently reduce flicker. In particular, flicker can be easily reduced at low gray levels.

Meanwhile, the driving controller may be configured to control the light emitting diodes to emit light during a second number of subframe periods greater than a first number of subframe periods set when the gray level of the frame is below the predetermined level. Accordingly, it is possible to efficiently reduce flicker. In particular, flicker can be easily reduced at low gray levels.

Meanwhile, the driving controller may be configured to control the light emitting diodes to emit light during a second light emission period longer than a first light emission period set when the gray level of the frame is below the predetermined level. Accordingly, it is possible to efficiently reduce flicker. In particular, flicker can be easily reduced at low gray levels.

Meanwhile, in response to the gray level of the frame being below the predetermined level, the driving controller may output the data signal based on pulse amplitude modulation to the light emitting diodes during each of the second number of subframe periods. Accordingly, it is possible to efficiently reduce flicker. In particular, flicker can be easily reduced at low gray levels.

Meanwhile, in response to the gray level of the frame being below the predetermined level, the driving controller may output a data signal of the same level to the light emitting diodes during each of the second number of subframe periods. Accordingly, it is possible to efficiently reduce flicker. In particular, flicker can be easily reduced at low gray levels.

Meanwhile, in response to the gray level of the frame being below the predetermined level, the driving controller may output data signals of different levels to the light emitting diodes during each of the second number of subframe periods. Accordingly, it is possible to efficiently reduce flicker. In particular, flicker can be easily reduced at low gray levels.

Meanwhile, in response to the gray level of the frame being below the predetermined level, the driving controller may output a data signal of the same level to the light emitting diodes during part of each of the second number of subframe periods. Accordingly, it is possible to efficiently reduce flicker. In particular, flicker can be easily reduced at low gray levels.

Meanwhile, in response to the gray level of the frame being below the predetermined level, the driving controller may be configured to control the light emitting diodes to emit light during each of the plurality of subframe periods. Accordingly, it is possible to efficiently reduce flicker. In particular, flicker can be easily reduced at low gray levels.

Meanwhile, in response to the gray level of the frame being below the predetermined level, the driving controller may output the data signal based on pulse amplitude modulation to the light emitting diodes emit light during each of the plurality of subframe periods. Accordingly, it is possible to efficiently reduce flicker. In particular, flicker can be easily reduced at low gray levels.

Meanwhile, in response to the gray level of the frame being below the predetermined level, the driving controller may output a data signal of the same level to the light emitting diodes during each of the plurality of subframe periods. Accordingly, it is possible to efficiently reduce flicker. In particular, flicker can be easily reduced at low gray levels.

Meanwhile, in response to the gray level of the frame being below the predetermined level, the driving controller may output data signals of different levels to the light emitting diodes during each of the plurality of subframe periods. Accordingly, it is possible to efficiently reduce flicker. In particular, flicker can be easily reduced at low gray levels.

Meanwhile, in response to the gray level of the frame being below the predetermined level, the driving controller may output a data signal of the same level to the light emitting diodes during part of each of the plurality of subframe periods. Accordingly, it is possible to efficiently reduce flicker. In particular, flicker can be easily reduced at low gray levels.

Meanwhile, in response to the gray level of the frame being above the predetermined level, the driving controller may output a data signal based on pulse width modulation to the light emitting diodes during each of the plurality of subframe periods, and in response to the gray level of the frame being below the predetermined level, the driving controller may output a data signal based on pulse amplitude modulation to the light emitting diodes during each of the plurality of subframe periods. Accordingly, it is possible to efficiently reduce flicker. In particular, flicker can be easily reduced at low gray levels.

Meanwhile, the plurality of light emitting diodes may include a red light emitting diode, a green light emitting diode, and a blue light emitting diode, and the driving controller may be configured to control the level of a data signal supplied to the red light emitting diode to be lower than the level of a data signal supplied to the green light emitting diode or the blue light emitting diode. Accordingly, a data signal corresponding to a light emitting diode can be outputted, and furthermore uniform colors can be rendered.

Meanwhile, the plurality of light emitting diodes may include a red light emitting diode, a green light emitting diode, and a blue light emitting diode, and, in response to the gray level of a frame including a plurality of subframes being above the predetermined level, the driving controller may be configured to control the number of subframes during which the red light emitting diode emits light to be less than or equal to the number of subframes during which the green light emitting diode or the blue light emitting diode emits light. Accordingly, a data signal corresponding to a light emitting diode can be outputted, and furthermore uniform colors can be rendered.

Meanwhile, the plurality of light emitting diodes may include a red light emitting diode, a green light emitting diode, and a blue light emitting diode, and, in response to the gray level of a frame including a plurality of subframes being a first level below the predetermined level, the driving controller may be configured to control the number of subframes during which the red light emitting diode emits light to be less than or equal to the number of subframes during which the green light emitting diode or the blue light emitting diode emits light. Accordingly, a data signal corresponding to a light emitting diode can be outputted, thereby efficiently reducing flicker.

Meanwhile, the image display apparatus according to an embodiment of the present disclosure may further comprise a signal processing device for outputting an image signal to the panel. Accordingly, a signal-processed image can be displayed.

An image display apparatus according to another embodiment of the present disclosure comprises: a panel having a plurality of light emitting diodes; and a driving controller configured to output a scan signal to the plurality of light emitting diodes during each of a plurality of subframe periods, wherein, in response to the gray level of a frame being below a predetermined level, the driving controller outputs a data signal based on pulse amplitude modulation to the light emitting diodes while dividing the gray level of the frame and distributing the divided gray level across at least part of the subframes. Accordingly, it is possible to efficiently reduce flicker. In particular, flicker can be easily reduced at low gray levels.

A video wall according to one embodiment of the present disclosure comprises a plurality of image display apparatuses, the image display apparatuses each comprising: a panel with a plurality of light emitting diodes; and a driving controller configured to output a scan signal to the plurality of light emitting diodes during each of a plurality of subframe periods, wherein, in response to the gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes. Accordingly, it is possible to efficiently reduce flicker. In particular, flicker can be easily reduced at low gray levels.

A video wall according to another embodiment of the present disclosure comprises a plurality of image display apparatuses, the image display apparatuses each comprising: a panel having a plurality of light emitting diodes; and a driving controller configured to output a scan signal to the plurality of light emitting diodes during each of a plurality of subframe periods, wherein, in response to the gray level of a frame being below a predetermined level, the driving controller outputs a data signal based on pulse amplitude modulation to the light emitting diodes while dividing the gray level of the frame and distributing the divided gray level across at least part of the subframes. Accordingly, it is possible to efficiently reduce flicker. In particular, flicker can be easily reduced at low gray levels.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. An image display apparatus comprising:

a panel with a plurality of light emitting diodes; and a driving controller configured to output a scan signal to the plurality of light emitting diodes during each of a plurality of subframe periods, wherein, in response to a gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes, wherein, in response to the gray level of the frame being below the predetermined level, the driving controller is configured to control a second non-light emission period set after performing the pulse amplitude modulation to be shorter than a first non-light emission period set before performing the pulse amplitude modulation, wherein a level of a data signal outputted by the driving controller when the gray level of the frame is below the predetermined level is less than a level of a data signal outputted by the driving controller when the gray level of the frame is above the predetermined level.

2. The image display apparatus of claim 1, wherein the driving controller controls a level of a data signal when the gray level of the frame is a first level below the predetermined level to be lower than level of a data signal when the gray level of the frame is the predetermined level.

3. The image display apparatus of claim 1, wherein the driving controller is configured to control the light emitting diodes to emit light during a second number of subframe periods greater than a first number of subframe periods set when the gray level of the frame is below the predetermined level.

4. The image display apparatus of claim 1, wherein the driving controller is configured to control the light emitting diodes to emit light during a second light emission period longer than a first light emission period set when the gray level of the frame is below the predetermined level.

5. The image display apparatus of claim 3, wherein, in response to the gray level of the frame being below the predetermined level, the driving controller outputs the data signal based on the pulse amplitude modulation to the light emitting diodes during each of the second number of sub-frame periods.

6. The image display apparatus of claim 3, wherein, in response to the gray level of the frame being below the predetermined level, the driving controller outputs a data signal of the same level to the light emitting diodes during each of the second number of subframe periods.

7. The image display apparatus of claim 3, wherein, in response to the gray level of the frame being below the predetermined level, the driving controller outputs data signals of different levels to the light emitting diodes during each of the second number of subframe periods.

8. The image display apparatus of claim 3, wherein, in response to the gray level of the frame being below the predetermined level, the driving controller outputs a data signal of a same level to the light emitting diodes during part of each of the second number of subframe periods.

9. The image display apparatus of claim 1, wherein, in response to the gray level of the frame being below the predetermined level, the driving controller is configured to control the light emitting diodes to emit light during each of the plurality of subframe periods.

10. The image display apparatus of claim 1, wherein, in response to the gray level of the frame being below the predetermined level, the driving controller outputs the data signal based on the pulse amplitude modulation to the light emitting diodes during each of the plurality of subframe periods.

11. The image display apparatus of claim 1, wherein, in response to the gray level of the frame being below the predetermined level, the driving controller outputs a data signal of a same level to the light emitting diodes during each of the plurality of subframe periods.

12. The image display apparatus of claim 1, wherein, in response to the gray level of the frame being below the predetermined level, the driving controller outputs data signals of different levels to the light emitting diodes during each of the plurality of subframe periods.

13. The image display apparatus of claim 1, wherein, in response to the gray level of the frame being below the predetermined level, the driving controller outputs a data signal of a same level to the light emitting diodes during part of each of the plurality of subframe periods.

14. The image display apparatus of claim 1, wherein, in response to the gray level of the frame being above the predetermined level, the driving controller outputs a data signal based on pulse width modulation to the light emitting diodes during each of the plurality of subframe periods, and in response to the gray level of the frame being below the predetermined level, the driving controller outputs a data signal based on the pulse amplitude modulation to the light emitting diodes during each of the plurality of subframe periods.

15. The image display apparatus of claim 1, wherein the plurality of light emitting diodes include a red light emitting diode, a green light emitting diode, and a blue light emitting diode, and wherein the driving controller is configured to control a level of a data signal supplied to the red light emitting diode to be lower than a level of a data signal supplied to the green light emitting diode or the blue light emitting diode.

16. The image display apparatus of claim 1, further comprising a signal processing device configured to output an image signal to the panel.

17. An image display apparatus comprising:

a panel having a plurality of light emitting diodes; and a driving controller configured to output a scan signal to the plurality of light emitting diodes during each of a plurality of subframe periods, wherein, in response to a gray level of a frame being below a predetermined level, the driving controller outputs a data signal based on pulse amplitude modulation to the light emitting diodes while dividing the gray level of the frame and distributing the divided gray level across at least part of the subframes, wherein the plurality of light emitting diodes include a red light emitting diode, a green light emitting diode, and a blue light emitting diode, and, wherein in response to the gray level of a frame including a plurality of subframes being a first level below the predetermined level, the driving controller is configured to control a number of subframes during which the red light emitting diode emits light to be less than or equal to a number of subframes during which the green light emitting diode or the blue light emitting diode emits light.

18. A video wall comprising a plurality of image display apparatuses, wherein the image display apparatus comprises:

a panel with a plurality of light emitting diodes; and a driving controller configured to output a scan signal to the plurality of light emitting diodes during each of a plurality of subframe periods, wherein, in response to a gray level of a frame including a plurality of subframes being above a predetermined level, the driving controller outputs a data signal based on pulse width modulation to the light emitting diodes, and in response to the gray level of the frame being below the predetermined level, the driving controller outputs a data signal based on pulse amplitude modulation to the light emitting diodes while dividing the gray level of the frame and distributing the divided gray level across at least part of the subframes, wherein, in response to the gray level of the frame being below the predetermined level, the driving controller is configured to control a second non-light emission period set after performing the pulse amplitude modulation to be shorter than a first non-light emission period set before performing the pulse amplitude modulation, wherein a level of a data signal outputted by the driving controller when the gray level of the frame is below the predetermined level is less than a level of a data signal outputted by the driving controller when the gray level of the frame is above the predetermined level.

* * * * *